(12) United States Patent
Powell

(10) Patent No.: US 11,955,277 B2
(45) Date of Patent: Apr. 9, 2024

(54) SUPERCONDUCTING CENTRIFUGAL LAUNCHER

(71) Applicant: Christopher Hugh Powell, Cambridge, MA (US)

(72) Inventor: Christopher Hugh Powell, Cambridge, MA (US)

( * ) Notice: Subject to any disclaimer, the term of this patent is extended or adjusted under 35 U.S.C. 154(b) by 0 days.

(21) Appl. No.: 17/199,398

(22) Filed: Mar. 11, 2021

(65) Prior Publication Data

US 2022/0293319 A1    Sep. 15, 2022

(51) Int. Cl.
*H01F 7/02*    (2006.01)
*B64G 1/00*    (2006.01)

(52) U.S. Cl.
CPC ........... *H01F 7/0236* (2013.01); *B64G 1/002* (2013.01)

(58) Field of Classification Search
CPC .............................. H01F 7/0236; B64G 1/002
See application file for complete search history.

(56) References Cited

U.S. PATENT DOCUMENTS

| | | | | |
|---|---|---|---|---|
| 4,874,346 A | * | 10/1989 | Wachspress | A63H 33/26 310/90.5 |
| 5,559,384 A | * | 9/1996 | Boland | F16C 32/044 505/879 |
| 2007/0205854 A1 | * | 9/2007 | Kazadi | H01F 7/0236 335/306 |
| 2017/0063194 A1 | * | 3/2017 | Puskarich | H02K 11/215 |
| 2017/0366109 A1 | * | 12/2017 | Orlando | B64G 1/402 |
| 2021/0376691 A1 | * | 12/2021 | Powell | H02K 7/025 |
| 2022/0029874 A1 | * | 1/2022 | Busbee | G06F 9/54 |

FOREIGN PATENT DOCUMENTS

| | | | | |
|---|---|---|---|---|
| CH | 714405 A2 | * | 6/2019 | ............. B60L 13/04 |
| WO | WO-2014016575 A1 | * | 1/2014 | ........... H01F 7/0236 |

* cited by examiner

*Primary Examiner* — Mohamad A Musleh

(57) ABSTRACT

Today, chemical rockets are the most expensive components of a launch; even reusable boosters require costly fuel, ongoing maintenance, and long durations between launches. As a result, far too many space bound opportunities are prohibitively expensive. However, kinetic launchers offer an economical alternative for projecting payloads into orbit. Harnessing angular velocity, a centrifuge gradually accelerates its payload to hypersonic speeds within a vacuum sealed chamber; upon reaching the desired speed, its airlock opens and the payload is released into the atmosphere. Flux-Pinned Superconductors offer a radical advancement to this technology; wherein, Flux Pinning is used to levitate and stabilize the launch package while reinforcing the entire platform against centrifugal stress. These Flux-Pinned joints require no power, lubricant or physical contact, while providing limitless stiffness that is essentially impervious to mechanical wear. Ultimately, we believe this centrifugal launch design will dramatically reduce the market's reliance on traditional chemical rockets.

22 Claims, 19 Drawing Sheets

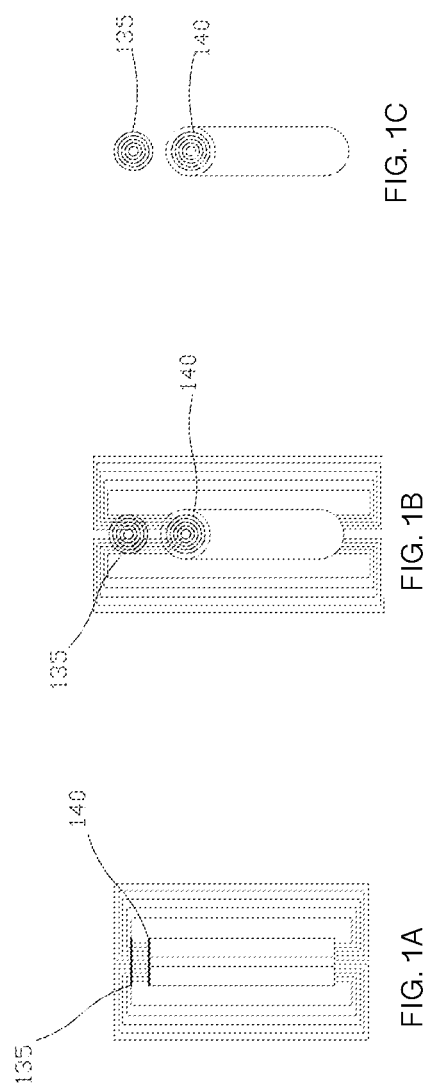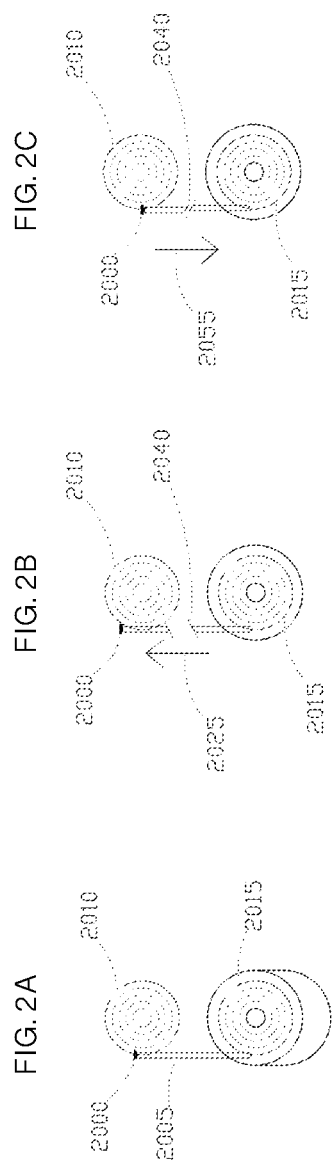

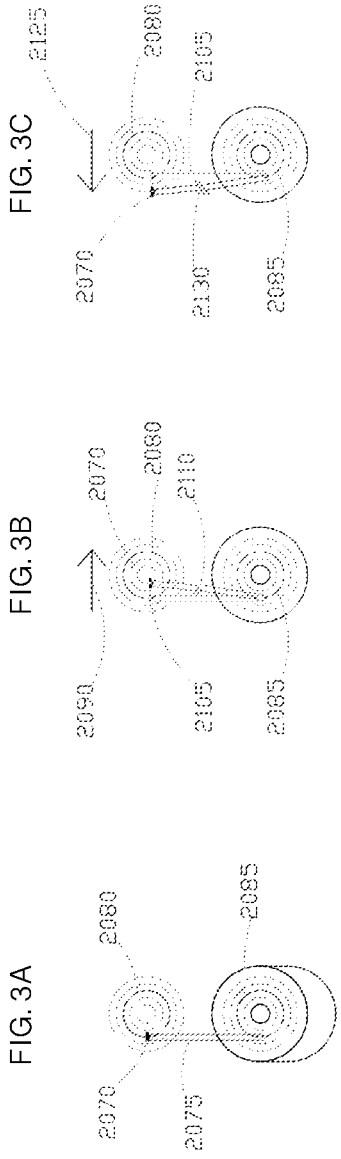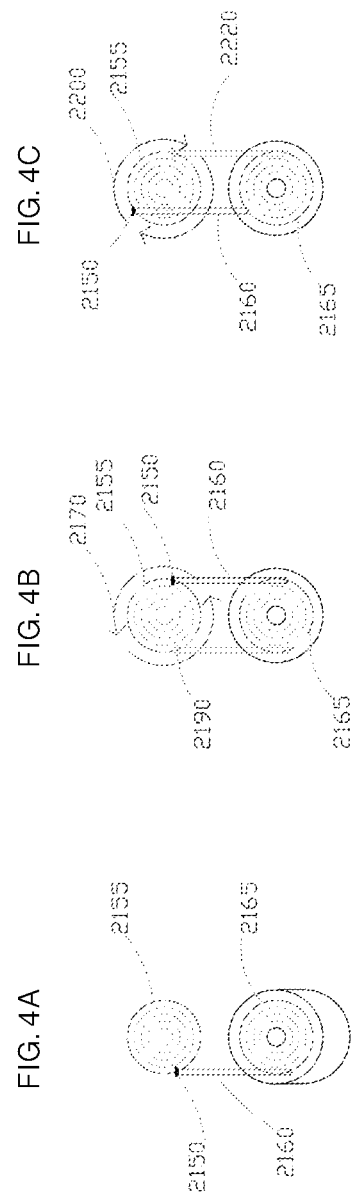

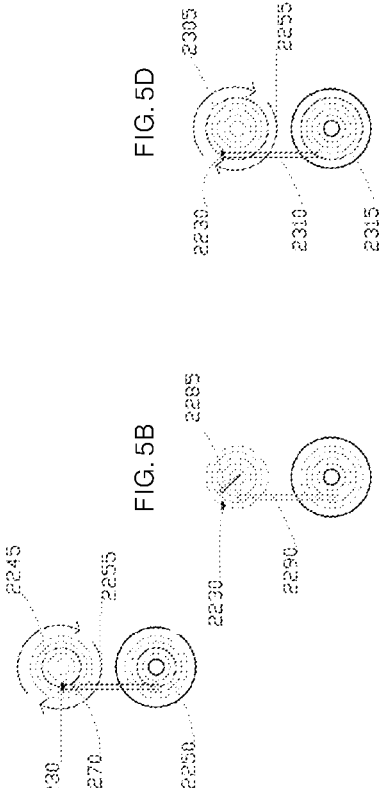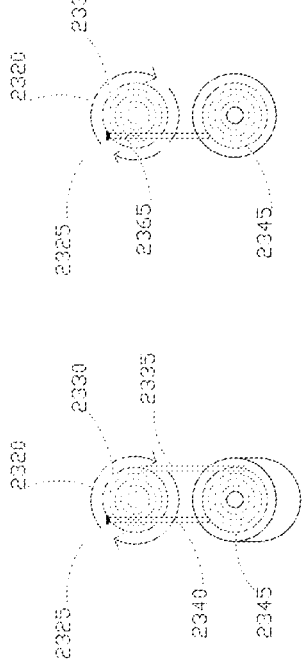

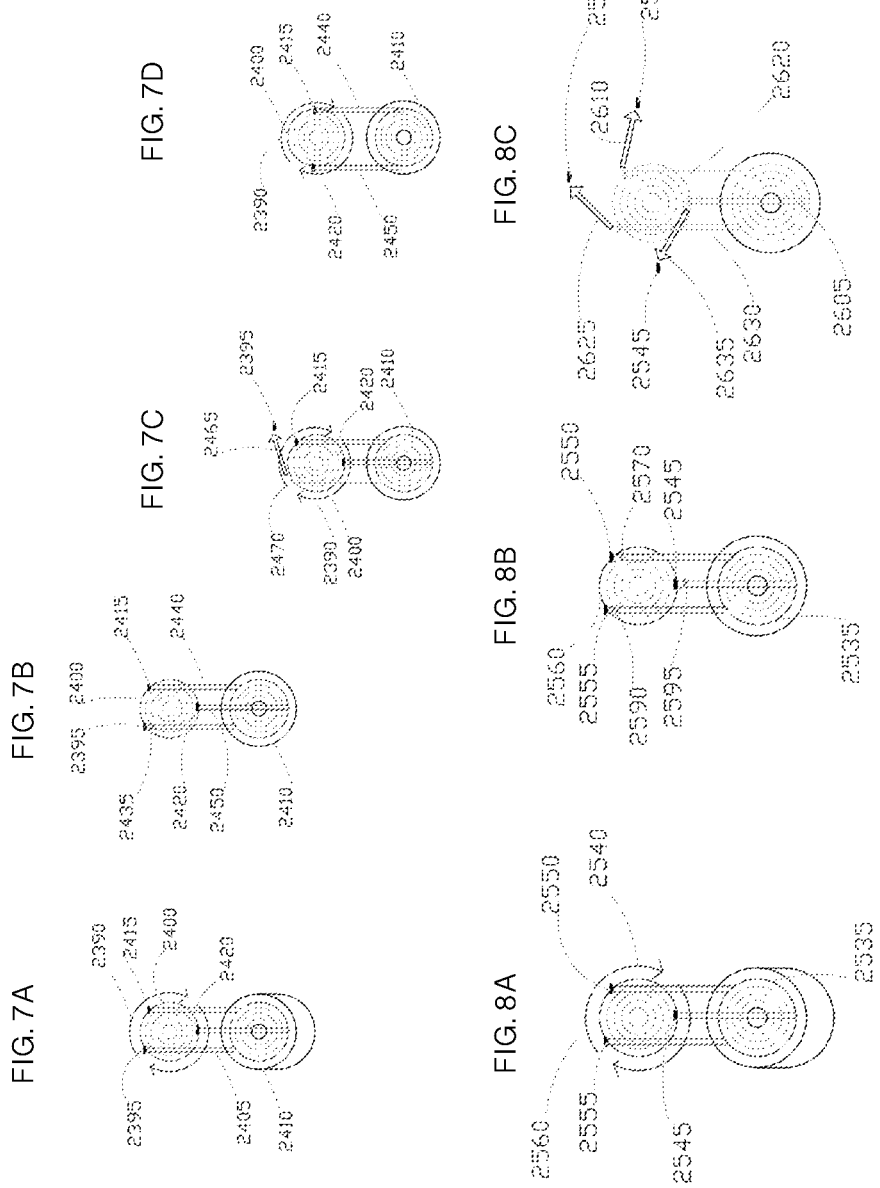

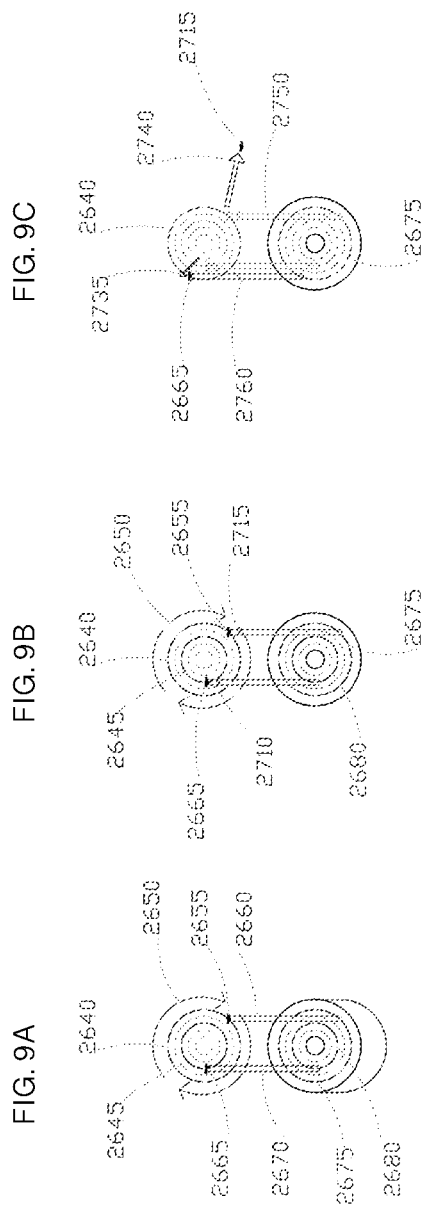

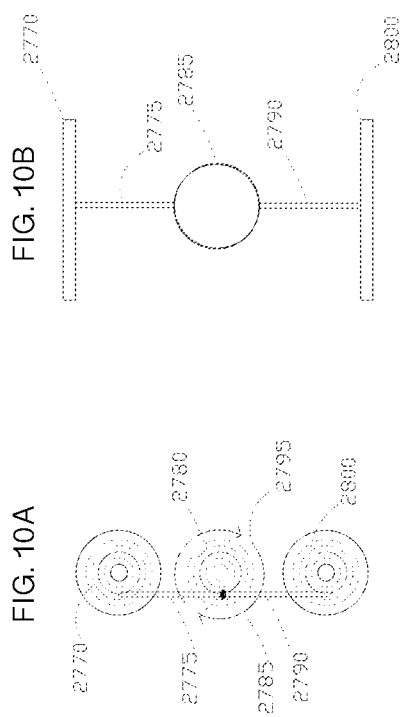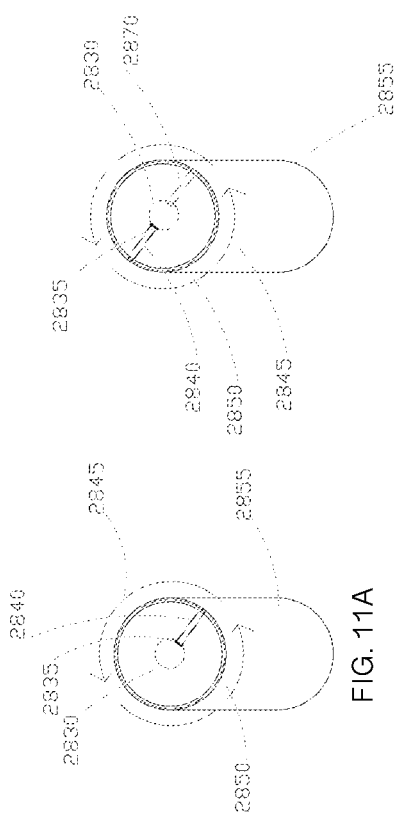

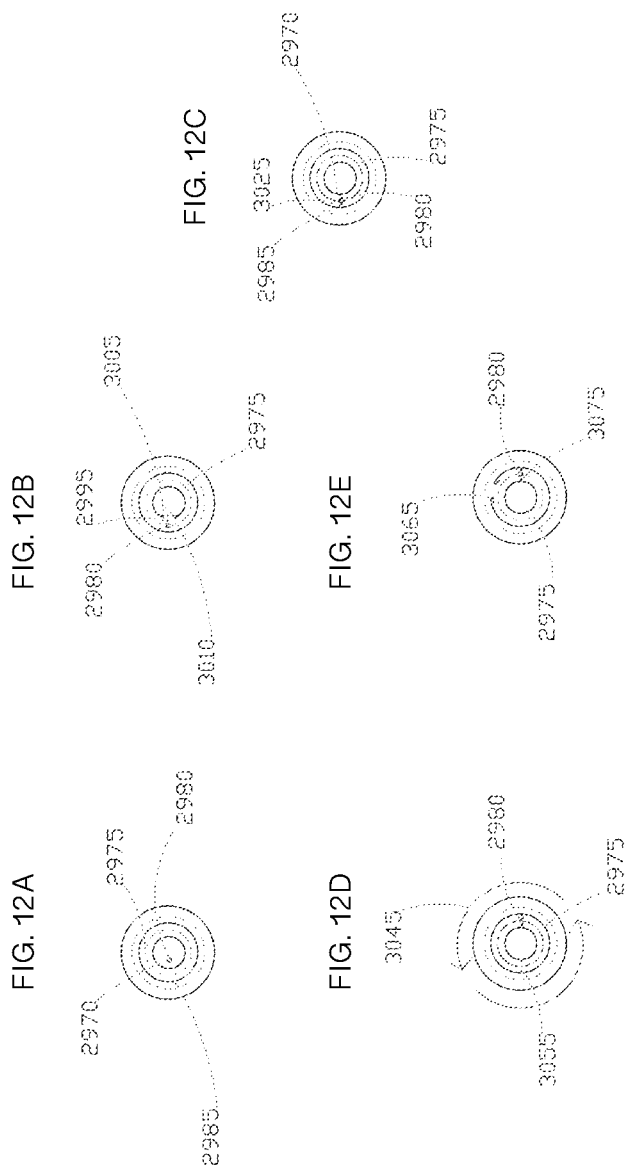

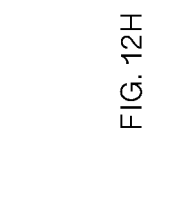
FIG. 12G
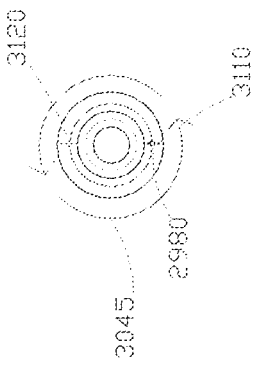
FIG. 12H
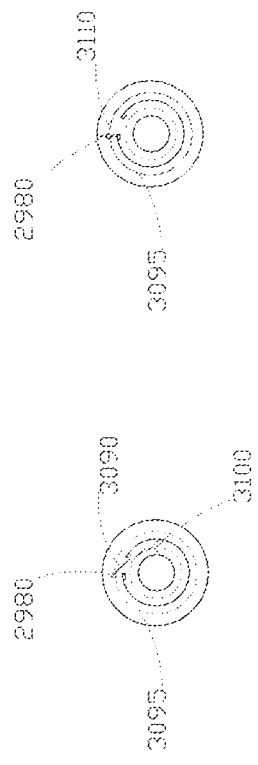
FIG. 12F
FIG. 12J
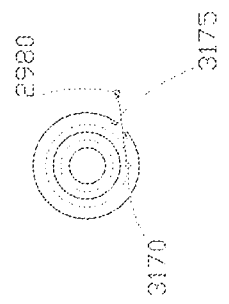
FIG. 12I
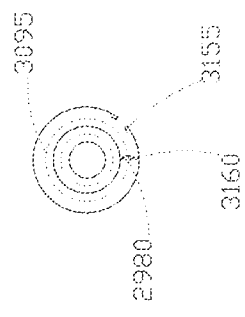

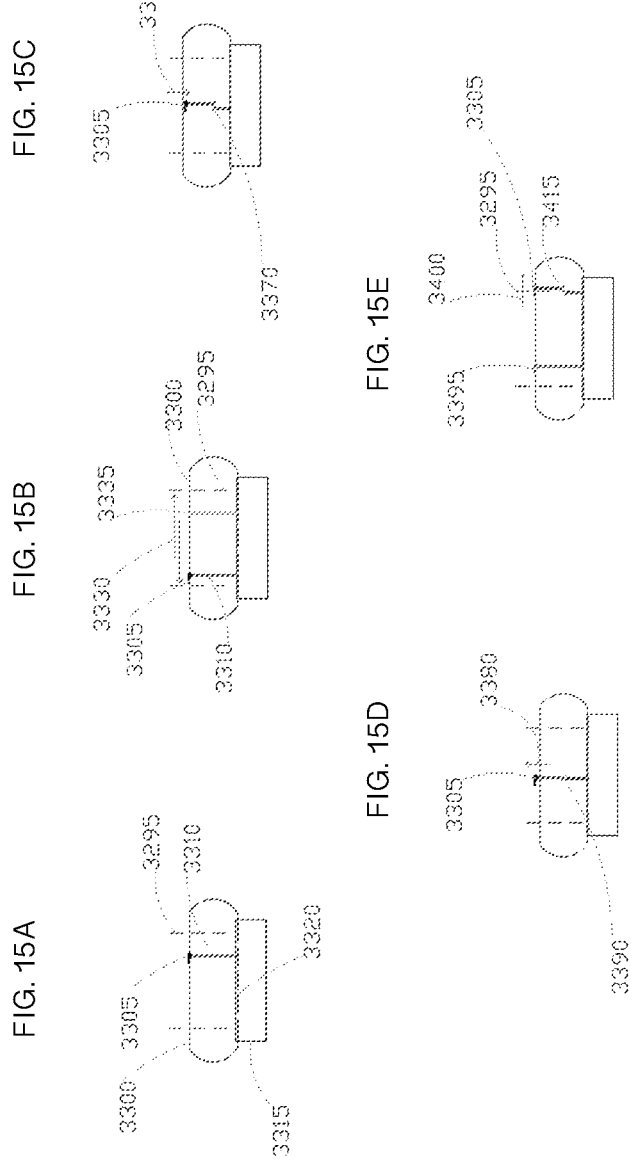

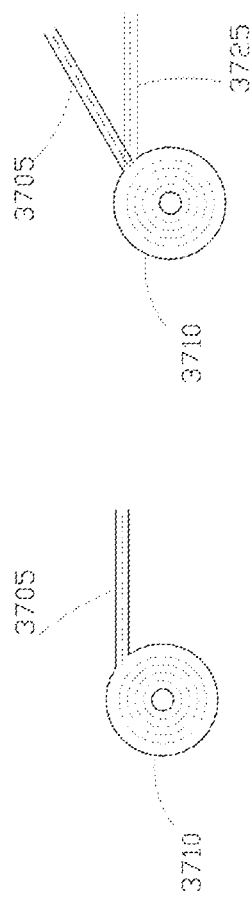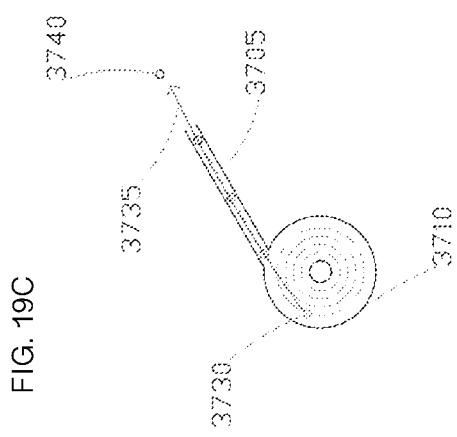
FIG. 19A
FIG. 19B
FIG. 19C

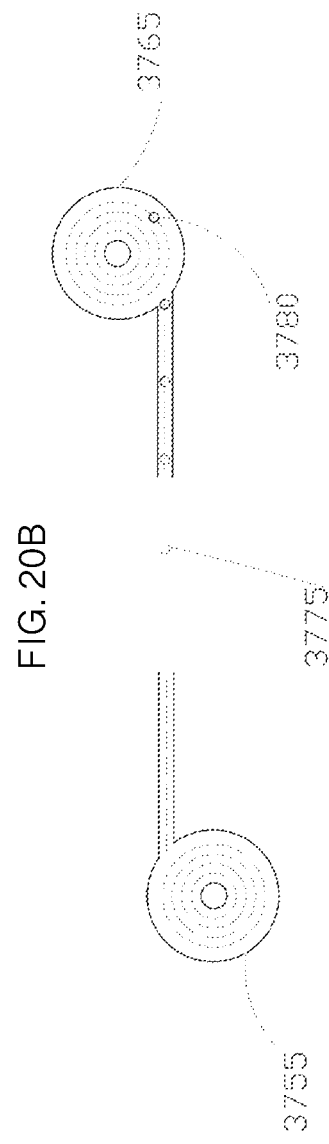
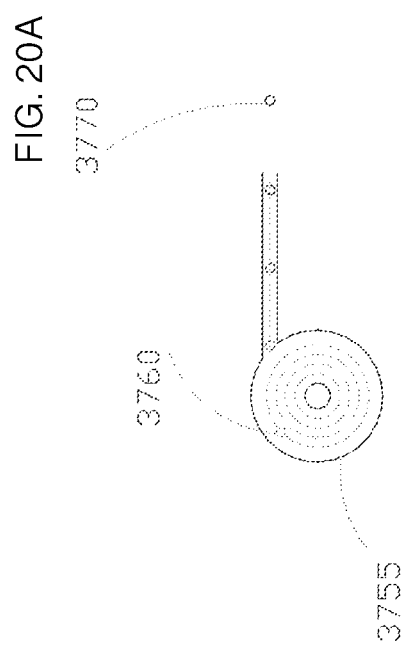
FIG. 20A
FIG. 20B

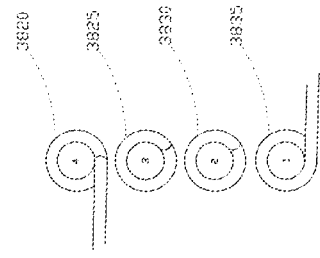
FIG. 21
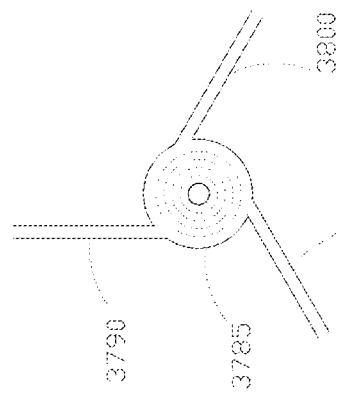
FIG. 22A
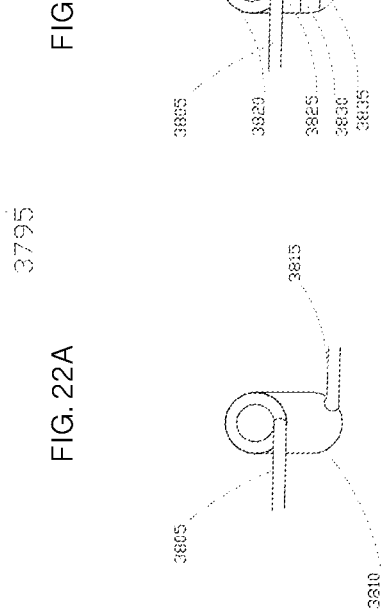
FIG. 22B
FIG. 22C

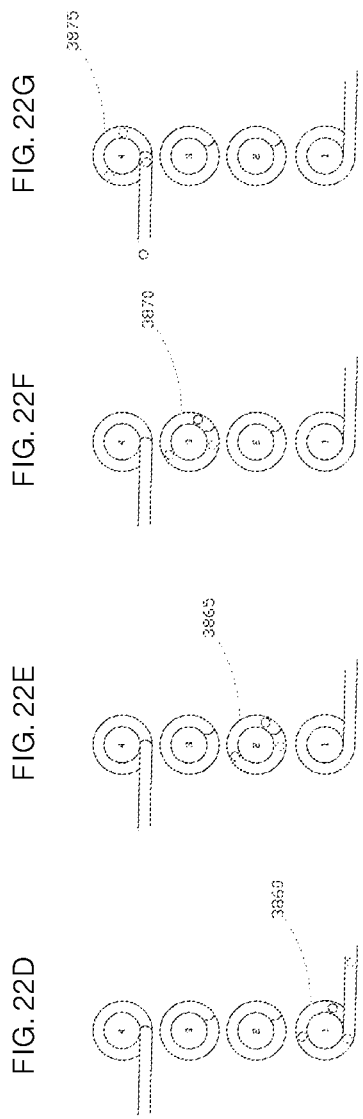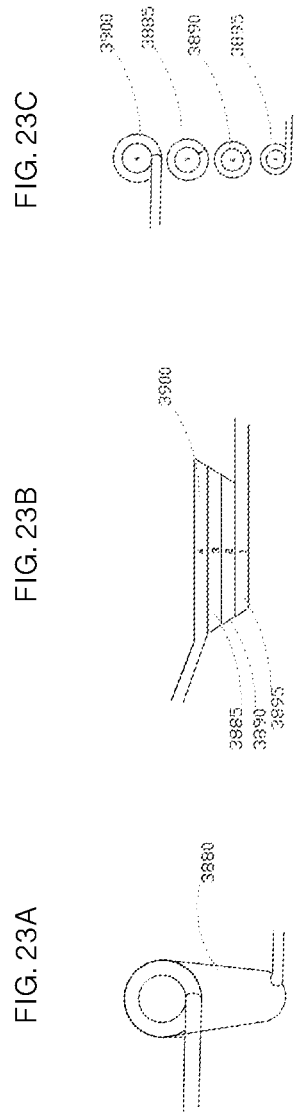

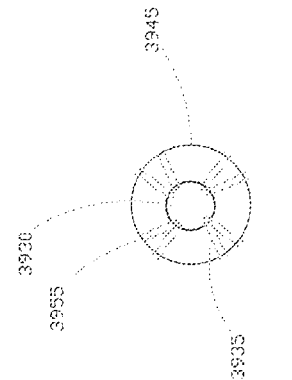
FIG. 24A
FIG. 24B
FIG. 24C
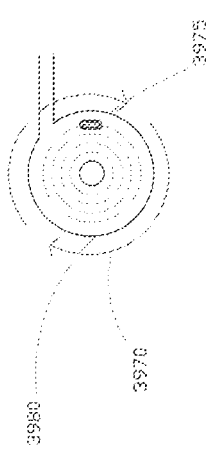
FIG. 25A
FIG. 25B
FIG. 25C

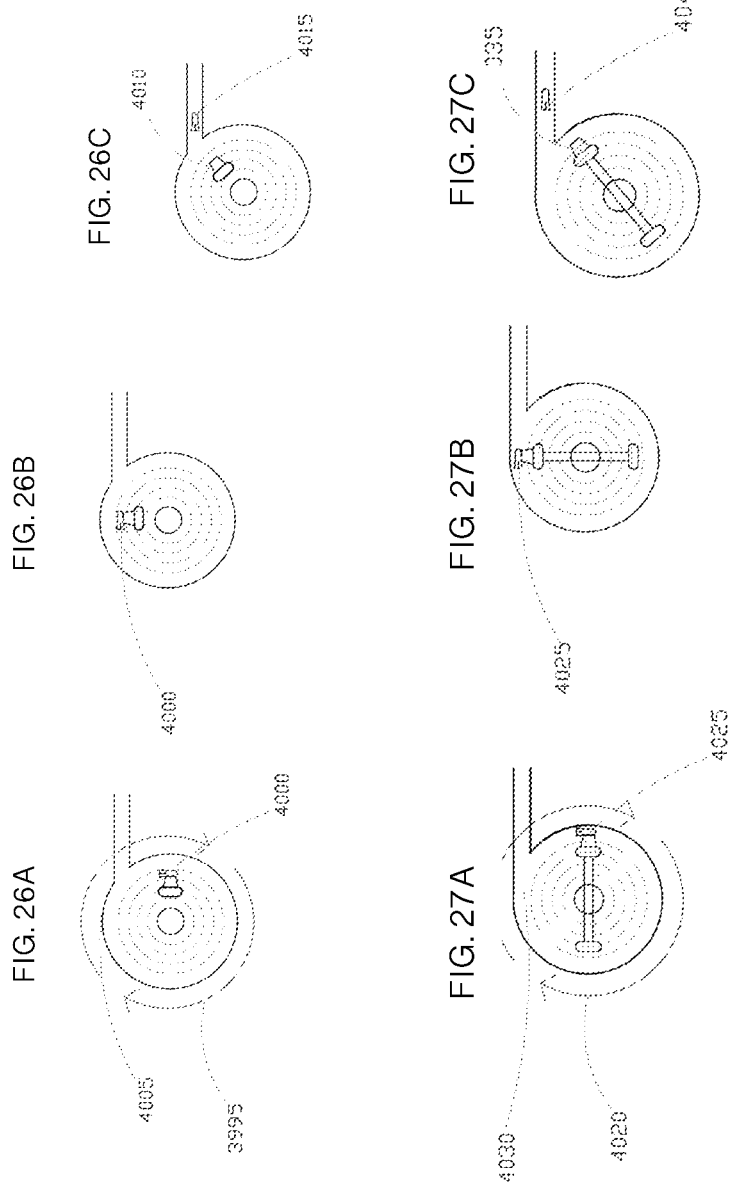

SUPERCONDUCTING CENTRIFUGAL LAUNCHER

CROSS REFERENCE TO RELATED APPLICATION(S)

This application claims the benefit of U.S. Provisional Patent Application(s) No. 62/988,496 and No. 63/018,857, which are incorporate by reference in their entirety.

FIELD OF THE INVENTION

The present application relates generally to kinetic launch systems. More specifically, the present application is directed to providing Remote Structural Reinforcement to a Superconducting Centrifugal Launcher.

BACKGROUND OF THE INVENTION

Kinetic launch systems not only offer us the opportunity to reduce society's dependence on costly chemical rockets, they also offer us the chance to significantly lower the cost accessing space-bound markets. By providing a competitively priced option that increases the frequency of launches, this solution may finally open the door to the aggressive expansion of Satellite-Based-Broadband.

A Centrifugal Launcher works by accelerating a Launch Vehicle, by means of articulating it within an enclosure, to a very high angular velocity. Upon reaching its desired velocity, the enclosure is opened and the Launch Vehicle is released into the opening. Traditional Centrifugal Launcher's use an electrical motor attached to an apparatus by which the Launch Vehicle is attached and/or articulated. More advanced versions of this design might include the use of a vacuum sealed (or semi sealed) enclosure.

One of the primary limits of traditional designs is the tensile strength of the launcher's moving components. These components undergo tremendous centrifugal stress during operation. Generally speaking, the stronger the said components, the faster the Launch Vehicle may be articulated; and ultimately, the more powerful the launcher. However, when the centrifugal stress exceeds the tensile strength of these moving components, the components will shatter resulting in a violent explosion and failure of the launch.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Various embodiments of the present disclosure may be directed to a arrangement of Flux Pinned Superconductors providing Remote Structural Reinforcement to the Superconducting Centrifugal Launcher through the use of the flux pinning (sometimes referred to as quantum locking) of one or more reinforced High Temperature Superconductors (HTSC) to a reinforced permanent cylindrical magnet.

Here, we have devised a system that uses Flux-Pinning to provide Remote Structural Reinforcement to a Superconducting Centrifugal Launcher. In this paired arrangement between the Levitator (i.e. the spinning launch platform) and the Centrifuge (i.e. the stationary base), the centrifuge is composed largely of the reinforced permanent cylindrical magnet while the Levitator is composed largely of reinforced HTSC. Upon reaching its critical temperature, the HTSC is able to form flux-pinned bonds, called Vortices, with the cylindrical permanent magnet. —The pair becomes three dimensionally suspended with one levitating a distance from the other. Furthermore, when properly oriented within the permanent cylindrical magnet's axially symmetric field, the pair form a frictionless hinge; whereas, one of the pair can be made to spin around the other using a contactless electromagnetic motor/generator. As such, they form the basis for a frictionless, non-contacting centrifuge.

[Both the electromagnetic motor and the permanent magnet components may be superconducting as well to improve the versatility of the platform).

Furthermore, this centrifuge utilizes the Vortices to produce Remote Structural Reinforcement of the Levitator. In this paradigm, layers of reinforcement strengthen the permanent magnet; and by strengthening the magnet, this system increases the load that the Levitator can transfer to the magnet via the Vortices. Hence, this reinforcement—with sufficiently strong Vortices—allows the magnet to keeps the Levitator in place despite any torque, drag or friction exerted on it by the centrifugal forces that inevitably result from a centrifuge's operation. This systems allows for the continual strengthening of Levitator without the need to add any additional mass to the actual Levitator's construction. Instead, any additional mass can be exclusively added to the magnetic base within the centrifuge.

Upon reaching the desired launch speed, the Levitator can be released through the ceasing of superconductivity. This can be achieved the any number of triggers (thermodynamic or otherwise) which will disrupt the superconductivity of the HTSC embedded within the Levitator.

In sum, Remote Structural Reinforcement offers a solution that allows for the Superconducting Centrifugal Launcher to support increased rotational speeds, without the need to increase the actual mass of the Levitator with reinforcement.

BRIEF DESCRIPTION OF DRAWINGS

Embodiments are illustrated by way of example and not by limitation in the figures of the accompanying drawings, in which like references indicate similar elements.

FIG. 1A illustrates a front/cross-section view of a cylindrical magnet with its magnetic field lines.

FIG. 1B illustrates a 3/4 front/top view of a cylindrical magnet with its magnetic field lines.

FIG. 1C illustrates a 3/4 front/top view of a cylindrical magnet with a particular selection of its magnetic field lines.

FIG. 2A is a 3/4 view of front/top of the cylindrical magnet; where a Levitator is flux-pinned to the magnet's upper portion. This illustration demonstrates how the Levitator, which is composed of High Temperature Superconductor (HTSC), forms flux-pinned bonds (called Vortices) with the magnet.

FIG. 2B is a 3/4 view of front/top of the cylindrical magnet. This illustration demonstrates the types of motion which are prohibited by the Vortices in this paradigm. Here, we examine the effects of traveling in a longitudinal (upward) motion on the Vortices.

FIG. 2C is a 3/4 view of front/top of the cylindrical magnet. This illustration demonstrates the types of motion which are prohibited by the Vortices in this paradigm. Here, we examine the effects of traveling in a longitudinal (downward) motion on the Vortices.

FIG. 3A is a 3/4 view of front/top of the cylindrical magnet; where a Levitator is flux-pinned to the magnet's upper portion. The Levitator is free to spin about the magnet's dipole axis, remaining at a constant radius from the dipole center.

FIG. 3B is a 3/4 view of front/top of the cylindrical magnet. This illustration demonstrates the types of motion which are prohibited by the Vortices in this paradigm. Here, we examine the effects of traveling in a latitudinal (sideways) motion on the Vortices.

FIG. 3C is a 3/4 view of front/top of the cylindrical magnet. This illustration demonstrates the types of motion which are prohibited by the Vortices in this paradigm. Here, we examine the effects of traveling in a latitudinal (sideways) motion on the Vortices.

FIG. 4A is a 3/4 view of front/top of the cylindrical magnet; where a Levitator is flux-pinned to the magnet's upper portion. This paradigm allows the Levitator to travel in a circular motion (clockwise or counter clockwise) about the Activated Orbital.

FIG. 4B is a 3/4 view of front/top of the cylindrical magnet; where a Levitator is flux-pinned to the magnet's upper portion. This paradigm allows the Levitator to travel in a circular motion (counter clockwise) about the Activated Orbital FIG. 4C is a 3/4 view of front/top of the cylindrical magnet; where a Levitator is flux-pinned to the magnet's upper portion.

FIG. 5A is a 3/4 view of front/top of the cylindrical magnet; where a Levitator is flux-pinned to the magnet's upper portion. In this series, we will explore how this system can be used to spin the Levitator in a circular pattern along the homogenous flux produced by Activated Orbital. Furthermore, these Vortices can be purposely broken—if only for a brief period—allowing the Levitator to move from its original Activated Orbital to a new orbital pattern of greater radius from the dipole axis. Once the Levitator has moved to a new Activated Orbital of greater radius than its original.

FIG. 5B is a 3/4 view of front/top of the cylindrical magnet; where a Levitator was previously flux-pinned to the magnet's upper portion. FIG. 5B illustrates the Vortices being purposely broken—if only for a brief period—allowing the Levitator to move from its original Activated Orbital to a new orbital pattern of greater radius than its originals.

FIG. 5C is a 3/4 view of front/top of the cylindrical magnet; where a Levitator—now released from its Vortices—moves outward from its original position towards an orbital of greater radius. Hence, the systems begins to behave (if briefly) like a catapult (or sling) of sorts.

FIG. 5D is a 3/4 view of front/top of the cylindrical magnet; where the Levitator has moved to a new Activated Orbital of greater radius than its original. The Vortices are reactivated, through abating any applied heat, magnetic interference, thermodynamic triggers et al, which previously inhibited flux pinning interactions. As such, the kinetic energy of the Levitator remains preserved causing it to spin about the magnet's dipole axis once again.

FIG. 6A is a 3/4 view of front/top of the cylindrical magnet; where a Levitator is flux-pinned to the magnet's upper portion. In this series, we will explore how this system can be used to spin the Levitator in a circular pattern along the homogenous flux produced by Activated Orbital within the Orbital Pattern. Furthermore, these Vortices can be purposely broken allowing the Levitator to move from its original Activated Orbital. In this way, the system acts as a sling or catapult of sorts FIG. 6B is a 3/4 view of front/top of the cylindrical magnet; where a Levitator was previously flux-pinned to the magnet's upper portion. FIG. 6B illustrates the Vortices being purposely broken—if only for a brief period—allowing the Levitator to move from its original Activated Orbital.

FIG. 6C is a 3/4 view of front/top of the cylindrical magnet; where a Levitator—freed from the vortices—begins moving outward. Once the Vortices have been deactivated, via thermodynamic triggers or the like, the Levitator then begins moving outward away from its previous position. As such, this behave like a catapult (or sling) of sorts.

FIG. 7A is a 3/4 view of front/top of the cylindrical magnet; where 3 Levitators (1st Levitator, 2nd Levitator, 3rd Levitator) are flux-pinned to the magnet's upper portion.

Figure 13A:
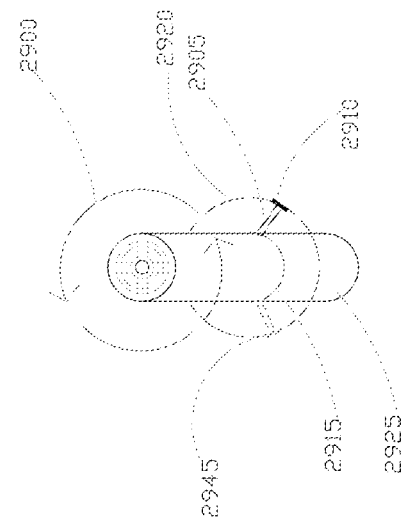

In this series, we will explore how this system can be used to spin several Levitators in a circular pattern along the homogenous flux produced by Activated Orbital. Furthermore, the Vortices connected to a single Levitator can be purposely broken allowing that Levitator to move from its original Activated Orbital.

FIG. 7B is a 3/4 view of front/top of the cylindrical magnet; where 2 Levitators (2nd Levitator, 3rd Levitator) are flux-pinned to the magnet's upper portion; whereas the 1st Levitator was previously flux-pinned to the magnet's upper portion. FIG. 7B illustrates its Vortices being purposely broken—if only for a brief period— allowing the Levitator to move from its original Activated Orbital.

FIG. 7C is a 3/4 view of front/top of the cylindrical magnet; where 2 Levitators (2nd Levitator, 3rd Levitator) are flux-pinned to the magnet's upper portion; whereas the 1st Levitator moves away from the magnet's upper portion. FIG. 7C illustrates its Vortices being purposely broken—if only for a brief period—allowing the Levitator to move outward from its original Activated Orbital. In this way, the system acts as a form of sling or catapult of sorts; while the remaining Levitator's can remain engage to their respective Vortices and continue to circulate FIG. 7D is a 3/4 view of front/top of the cylindrical magnet; where 2 Levitators (2nd Levitator, 3rd Levitator) are flux-pinned to the magnet's upper portion; whereas after the escape of the single Levitator, the remaining engaged Levitators can adjust their speed and position with respect to one another in order to rebalance the centrifugal forces of the system.

FIG. 8A is a 3/4 view of front/top of the cylindrical magnet; where 3 Levitators (1st Levitator 2555, 2nd Levitator 2550, 3rd Levitator 2545) are flux-pinned to the magnet's upper portion. Each Levitator is free to spin 2540 about the magnet's dipole axis, remaining at a constant radius from the dipole center. As such, each Levitator is fixed in every degree of freedom except for its rotation about magnet's axis of symmetry (i.e. magnet's dipole axis). This paradigm allows each Levitator to travel in a circular motion (clockwise) about the Activated Orbital 2560. Notice that the motions illustrated here produce no torque or resistance from the Vortices; the bonds are maintained throughout the action. Notice how the Vortices extend from the Activated Orbital to the Activated Image 2535 illustrated on the surface of the magnet. The Activated Image is the portion of the magnet that corresponds to the homogeneous flux required for there to be certain unrestricted degrees of freedom—in this case a circular motion about the magnet's dipole axis.is a 3/4 view of front/top of the cylindrical magnet; where 3 Levitators (1st Levitator 2555, 2nd Levitator 2550, 3rd Levitator 2545) are flux-pinned to the magnet's upper portion. Each Levitator is free to spin 2540 about the magnet's dipole axis, remaining at a constant radius from the dipole center. As such, each Levitator is fixed in every degree of freedom except for its rotation about magnet's axis of symmetry (i.e. magnet's dipole axis). This paradigm allows each Levitator to travel in a circular motion (clockwise) about the Activated Orbital 2560. Notice that the motions illustrated here produce no torque or resistance from the Vortices; the bonds are maintained throughout the action. Notice how the Vortices extend from the Activated Orbital to the Activated Image 2535 illustrated on the surface of the magnet. The Activated Image is the portion of the magnet that corresponds to the homogeneous flux required for there to be certain unrestricted degrees of freedom—in this case a circular motion about the magnet's dipole axis.

FIG. 8B is a 3/4 view of front/top of the cylindrical magnet; where 3 Levitators (1st Levitator 2555, 2nd Levitator 2550, 3rd Levitator 2545) were previously flux-pinned to the magnet's upper portion. FIG. 8B illustrates its Vortices being purposely broken (1st's Vortices 2590, 2nd's Vortices 2570, 3rd's Vortices 2595)—if only for a brief period—allowing the Levitators to move from their original Activated Orbital 2560. In this way, the system acts as a form of sling or catapult of sorts. Notice how the Vortices previously extended from the Activated Orbital to the Activated Image 2535 illustrated on the surface of the magnet.

FIG. 8C is a 3/4 view of front/top of the cylindrical magnet; where 3 Levitators (1st Levitator 2555, 2nd Levitator 2550, 3rd Levitator 2545) were previously flux-pinned to the magnet's upper portion.; whereas all 3 Levitators move away (1st's direction 2625, 2nd's direction 2610, 3rd's direction 2635) from the magnet's upper portion away from their original respective positions (1st's position 2630, 2nd's position 2620, 3rd's position 2605).

FIG. 9A is a 3/4 view of front/top of the cylindrical magnet; where 3 Levitators (1st Levitator , 2nd Levitator, 3rd Levitator) are flux-pinned to the magnet's upper portion. In this series, we will explore how this system can be used to spin several Levitators in a circular pattern along the homogenous flux produced by Activated Orbital. Furthermore, the Vortices connected to all three Levitators can be purposely broken allowing these Levitators to move from their original Activated Orbital. In this way, the system acts as a form of sling or catapult of sorts.

FIG. 9B is a 3/4 view of front/top of the cylindrical magnet; where 3 Levitators (1st Levitator, 2nd Levitator, 3rd Levitator) were previously flux-pinned to the magnet's upper portion. FIG. 9B illustrates its Vortices being purposely broken (1st's Vortices, 2nd's Vortices, 3rd's Vortices)—if only for a brief period—allowing the Levitators to move from their original Activated Orbital. In this way, the system acts as a form of sling or catapult of sorts.

FIG. 9C is a 3/4 view of front/top of the cylindrical magnet; where 3 Levitators (1st Levitator, 2nd Levitator, 3rd Levitator) were previously flux-pinned to the magnet's upper portion.; whereas all 3 Levitators move away (1st's direction, 2nd's direction, 3rd's direction) from the magnet's upper portion away from their original respective positions (1st's position, 2nd's position, 3rd's position).

FIG. 10A is a 3/4 view of front/top of a Levitator sandwiched between the two cylindrical magnets. This series demonstrates how a single Levitator may forms Vortices) with several (two) magnets (one magnet above the Levitator and one below the Levitator);

FIG. 10B is a front / cross-section view of the of a Levitator sandwiched between the two cylindrical magnets. Notice how the upper Vortices extend from the Levitator to the upper Activated Image on the upper magnetic surface.

FIG. 11A is a 3/4 view of front/top of a thin/hollow cylindrical magnet with a Levitator flux pinned within its cavity. Here, we will illustrate a Levitator that is flux-pinned to the side of the inner portion of a hollow cylindrical magnet.

FIG. 11B is a 3/4 view of front/top of a thin/hollow cylindrical magnet with a Levitator flux pinned within its cavity. Here, we will illustrate a Levitator that is flux-pinned to the side of the inner portion of a hollow cylindrical magnet.

FIG. 12A illustrates a top/cutaway view of the Superconducting Centrifuge with the Levitator within its center waiting to be placed into the launch cavity.

FIG. 12B illustrates the Levitator being deposited into the innermost tube where it has access to the Activated Orbital FIG. 12C illustrates how the superconducting shell of the Levitator—having reached its critical temperature—allows the Levitator to form Vortices with the inner and outer magnetic walls of the tube.

FIG. 12D illustrates the movement of the Levitator in a clockwise fashion with the innermost tube along the Activated Orbital FIG. 12E illustrates the opening of the outer magnetic wall of the inner tube in preparation for the Levitator's transition.

FIG. 12F illustrates the Levitator moves from its original Activated Orbital and through the Access Door.

FIG. 12G illustrates the Levitator returns its shell to its original superconducting state allowing the Levitator to form Vortices with the inner and outer Magnetic Walls of the tube.

FIG. 12H illustrates how the momentum generated in prior revolutions allows the Levitator to continue circling the tube at high speeds. Additionally, electromagnetic motors/systems (not illustrated) begin spinning the Levitator at even higher speeds within the tube.

FIG. 12I illustrates the Access Door located within outer wall of the tube opens. And the Levitator deactivates its Vortices (by modulating/abating the superconductivity of its shell)—deactivating its Activated Orbital—and allowing it to move away FIG. 12J illustrates the Levitator moving from its Activated Orbital and through the Access Door.

FIG. 13A is a 3/4 view of front/top of the cylindrical magnet with a Levitator flux pinned to the outer side portion of the magnet. Here, we will illustrate that when the Levitator is flux-pinned to the side of the cylindrical magnet certain circular motions are now allowed without any torque, resistance or breaking of Vortices.

Figure 13B:
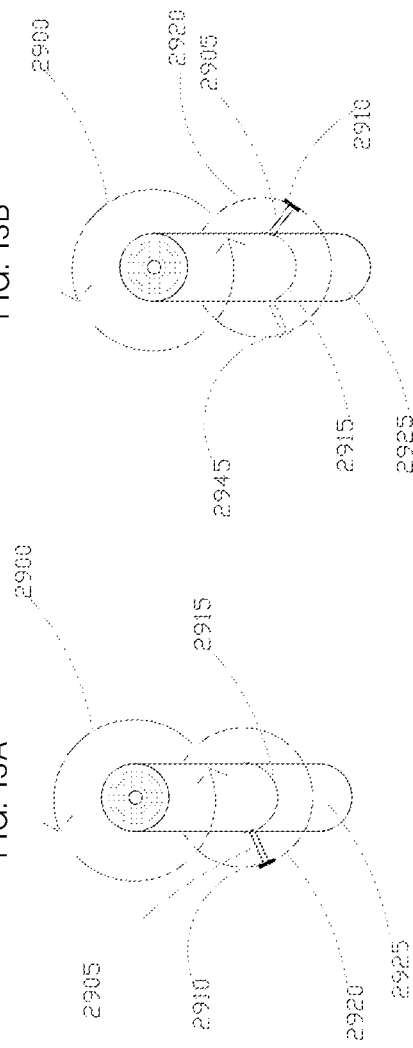

FIG. 13B is a 3/4 view of front/top of the cylindrical magnet with a Levitator flux pinned to the outer side portion of the magnet. Here, we will illustrate that when the Levitator is flux-pinned to the side of the cylindrical magnet certain circular motions are now allowed without any torque, resistance or breaking of Vortices.

Figure 14A:
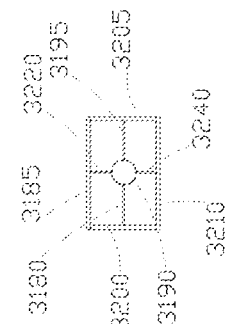

FIG. 14A illustrates a front/cross section view demonstrating that a Levitator can be flux pinned to Vortices on lateral planes.

Figure 14B:
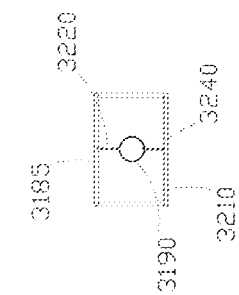

FIG. 14B illustrates a front/cross section view demonstrating that a Levitator can be flux pinned to Vortices on planes both above and below it.

Figure 14C:
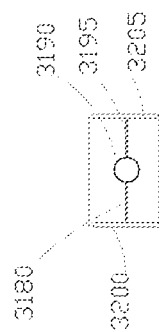

FIG. 14C illustrates a front/cross section view demonstrating that a Levitator can be flux pinned to Vortices on planes both above and below it as well as on lateral planes.

FIG. 15A illustrates a side view/cross-section of the rectangular magnet with its field lines. The rectangular magnet has been flux pinned to a Levitator with Vortices forming between them.

FIG. 15B illustrates a side view/cross-section the rectangular magnet having been flux pinned to a Levitator; Levitator makes lateral motion along the Activate Rail within its allowable degree of freedom within the boundary of homogenous flux produced by the magnet.

FIG. 15C illustrates a side view/cross-section the rectangular magnet with the Levitator. In this illustration, the Vortices bonding the Levitator to the magnet have been broken. The cause of this was the Levitator committing motions beyond the Vortices' allowable degrees of freedom.

FIG. 15D illustrates a side view/cross-section the rectangular magnet with the Levitator. In this illustration, the Vortices bonding the Levitator to the magnet—as previously observed in FIG. 15B of this series—have been broken. The cause of this was the Levitator committing motions beyond the Vortices' allowable degrees of freedom.

FIG. 15E illustrates a side view/cross-section the rectangular magnet with the Levitator. In this illustration, the Vortices bonding the Levitator to the magnet—as previously observed in FIG. 15B of this series—have been broken.

Figure 16A:
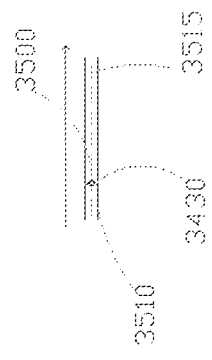

FIG. 16A illustrates a side view/cross-section the LaunchTube. Here, we are demonstrating the interactions between Levitator and a LaunchTube.

Figure 16B:
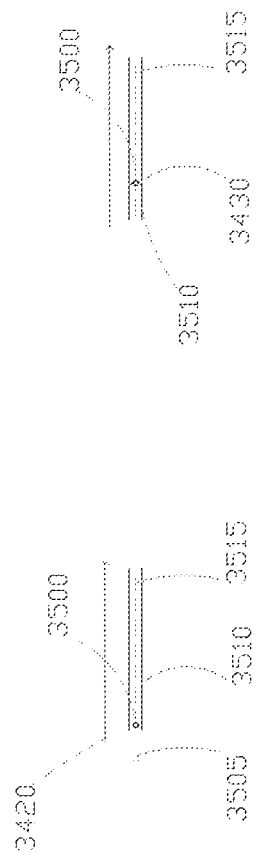

FIG. 16B illustrates a side view/cross-section the LaunchTube. Here, we are demonstrating Levitator becoming Flux Pinned to Vortices within LaunchTube.

Figure 16C:
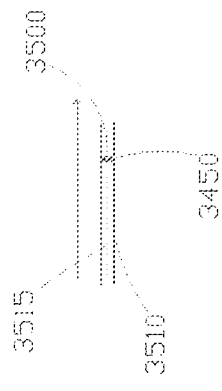
Figure 16D:
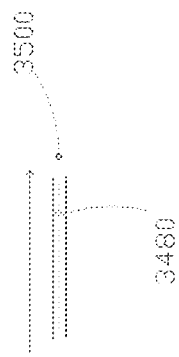

FIG. 16C illustrates a side view/cross-section the LaunchTube. Here, we are demonstrating Levitator traveling down LaunchTube on the Activated Rail FIG. 16D illustrates a side view/cross-section the LaunchTube. Levitator exiting LaunchTube The Levitator's previous position noted.

Figure 17A:
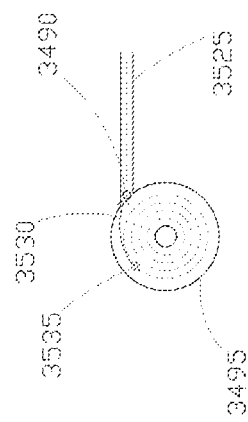

FIG. 17A is illustrating a top view of a Superconducting Centrifuge combined with the LaunchTube for added versatility/precision.

Figure 17B:
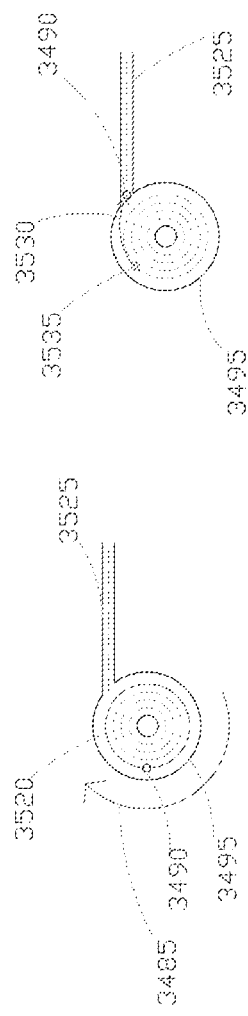

FIG. 17B is illustrating a top view of a Superconducting Centrifuge combined with the LaunchTube for added versatility/precision. The Vortices connecting the Levitator to the magnetic surfaces of the Superconducting Centrifuge are purposely broken allowing the Levitator to exit the Superconducting Centrifuge at high speeds via the LaunchTube.

Figure 17C:
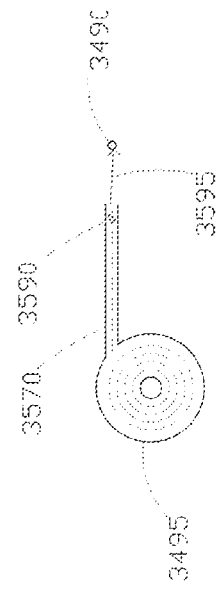

FIG. 17C is illustrating a top view of a Superconducting Centrifuge combined with the LaunchTube for added versatility/precision. After being deposited into the LaunchTube, the Levitator engaged in creating Vortices with the Activate Rail of the LaunchTube.

Figure 17D:
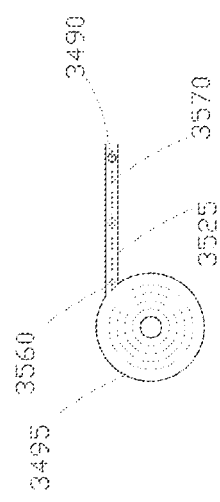

FIG. 17D is illustrating a top view of a Superconducting Centrifuge combined with the LaunchTube for added versatility/precision. As the Levitator reaches the end of the LaunchTube, its Vortices are purposely broken—via thermodynamic trigger—allowing the Levitator to exit the end of the LaunchTube at high speeds.

Figure 18B:
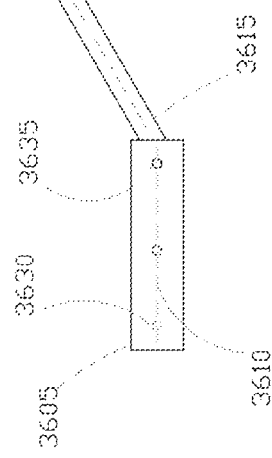
Figure 18D:
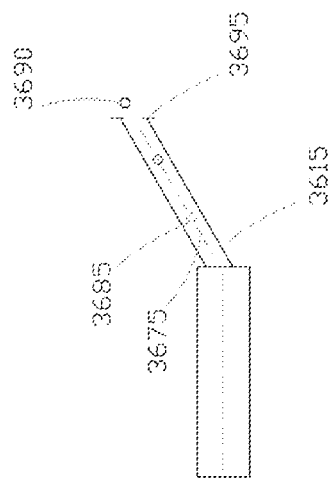
Figure 18A:
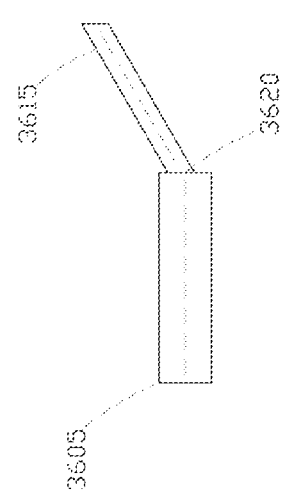

FIG. 18A is illustrating a side/cutaway view of a Superconducting Centrifuge combined with the angled LaunchTube for added versatility/precision. Notice that the LaunchTube is angled upwards.

FIG. 18B is illustrating a side/cutaway view of a Superconducting Centrifuge combined with the angled LaunchTube for added versatility/precision. Levitator is traveling within the Superconducting Centrifuge (utilizing flux-pinning interactions Discussed in FIG. 17.) along the Activated Rail. Levitator's previous position is noted.

Figure 18C:
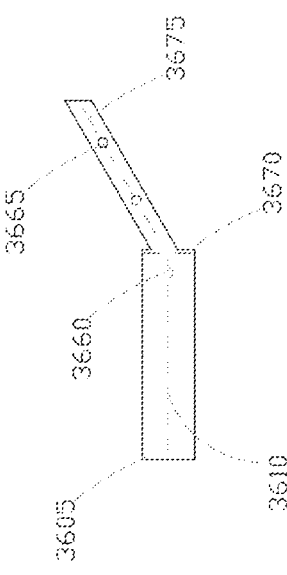

FIG. 18C is illustrating a side/cutaway view of a Superconducting Centrifuge combined with the angled LaunchTube for added versatility/precision. The Vortices connecting the Levitator to the surfaces of the Superconducting Centrifuge are purposely broken allowing the Levitator to exit the Superconducting Centrifuge at high speeds via the LaunchTube.

FIG. 18D is illustrating a side/cutaway view of a Superconducting Centrifuge combined with the angled LaunchTube for added versatility/precision. After being deposited into the LaunchTube the Levitator engaged in creating Vortices with the Activate Rail of the LaunchTube. It then begins traveling along the LaunchTube at high speeds.

FIG. 19A is illustrating a top/cutaway view of a Superconducting Centrifuge combined with the LaunchTube for added versatility/precision.

FIG. 19B is illustrating a top/cutaway view of a Superconducting Centrifuge combined with the LaunchTube for added versatility/precision.

FIG. 19C is illustrating a top/cutaway view of a Superconducting Centrifuge combined with the LaunchTube for added versatility/precision. Here, Levitator is launched from the Superconducting Centrifuge/LaunchTube after the LaunchTube's position has been altered.

FIG. 20A is illustrating a top/cutaway view of two Superconducting Centrifuges combined with LaunchTubes. Here, we demonstrate a set of (2) two Superconducting Centrifuges/LaunchTubes with differing roles.

FIG. 20B is illustrating a top/cutaway view of two Superconducting Centrifuges combined with LaunchTubes. The second Superconducting Centrifuge/LaunchTube is catching the Levitator that was launch by the first Superconducting Centrifuge/LaunchTube.

FIG. 21A is illustrating a top/cutaway view of a Superconducting Centrifuges combined with three LaunchTubes. Here, we demonstrate a version of the Superconducting Centrifuge with several LaunchTubes, allowing for Levitators to be launched from various direction and even simultaneously.

FIG. 22A is 3/4 view Illustrating a series where a type of LaunchTube is demonstrated. In particular, this LaunchTube is spiraled in a vertical configuration.

FIG. 22B is 3/4 cutaway view of a LaunchTube with a spiraled vertical configuration. We've illustrated each of the Spiral Body's four levels.

FIG. 22C is a top exploded view of a LaunchTube with a spiraled vertical configuration. We've illustrated each of the Spiral Body's four levels.

FIG. 22D is a top exploded view of a LaunchTube with a spiraled vertical configuration. We've illustrated each of the Spiral Body's four levels.

FIG. 22E is a top exploded view of a LaunchTube with a spiraled vertical configuration. We've illustrated each of the Spiral Body's four levels. Here, we observe progression of Levitator FIG. 22F is a top exploded view of a LaunchTube with a spiraled vertical configuration. We've illustrated each of the Spiral Body's four levels.

FIG. 22G is a top exploded view of a LaunchTube with a spiraled vertical configuration. We've illustrated each of the Spiral Body's four levels.

FIG. 23A is a 3/4 view of a LaunchTube with a spiraled vertical configuration. In the present confirmation, the Spiral has the attribute of continuously increasing the circumference of each of its upper layers.

FIG. 23B is a side cutaway view a LaunchTube with a spiraled vertical configuration. In the present confirmation, the Spiral has the attribute of continuously increasing the circumference of each of its upper layers.

FIG. 23C is a top exploded view a LaunchTube with a spiraled vertical configuration. In the present confirmation, the Spiral has the attribute of continuously increasing the circumference of each of its upper layers.

FIG. 24A is a front/cutaway view of a LaunchTube that can be used alone or in coordination with an of the previously discussed Superconducting Centrifuges. Here, we demonstrate a version using curved magnetic surfaces increase the surface area available for forming Vortices with the Levitator.

FIG. 24B is a front/cutaway view of a LaunchTube that can be used alone or in coordination with an of the previously discussed Superconducting Centrifuges. Here, we demonstrate a version using curved magnetic surfaces increase the surface area available for forming Vortices with the Levitator.

FIG. 24C is a front/cutaway view of a LaunchTube that can be used alone or in coordination with an of the previously discussed Superconducting Centrifuges. Here, we demonstrate a version using tubular magnetic surfaces increase the surface area available for forming Vortices with the Levitator.

FIG. 25A is illustrating a top/cutaway view of a Superconducting Centrifuge. Here, we are illustrating another version of the Superconducting Centrifugal Launcher where the Levitator does not detach from the Centrifuge; instead, the Levitator acts as a accelerating platform on which the Launch Package is brought to speed.

FIG. 25B is illustrating a top/cutaway view of a Superconducting Centrifuge. In this illustration, the Levitator/Launch Package combination have reached a point of detachment.

FIG. 25C is illustrating a top/cutaway view of a Superconducting Centrifuge. In this illustration, the Levitator has detached from the Launch Package allowing the Launch Package to exit the centrifuge.

FIG. 26A is illustrating a top/cutaway view of a Superconducting Centrifuge. Here, we are illustrating another version of the Superconducting Centrifugal Launcher where the Levitator does not detach from the Centrifuge; instead, the Levitator acts as an accelerating platform on which the Launch Package is brought to speed. Furthermore, attached to the Levitator platform is a highly Reinforced Yoke to which the Launch Package is attached.

FIG. 26B is illustrating a top/cutaway view of a Superconducting Centrifuge. In this illustration, the Levitator/Yoke/Launch Package combination have reached a point of detachment.

FIG. 26C is illustrating a top/cutaway view of a Superconducting Centrifuge. In this illustration, the Levitator/Yoke combination has detached from the Launch Package allowing the Launch Package to exit the centrifuge.

FIG. 27A is illustrating a top/cutaway view of a Superconducting Centrifuge. Here, we are illustrating another version of the Superconducting Centrifugal Launcher where the Levitator does not detach from the Centrifuge; instead, the Levitator acts as a accelerating platform on which the Launch Package is brought to speed. Furthermore, attached to the Levitator platform is a highly reinforced Yoke to which the Launch Package is attached.

FIG. 27B is illustrating a top/cutaway view of a Superconducting Centrifuge. In this illustration, the Levitator/Yoke/Reinforcing Platform/Launch Package combination have reached a point of detachment.

FIG. 27C is illustrating a top/cutaway view of a Superconducting Centrifuge. In this illustration, the Levitator/Yoke/Reinforcing Platform combination has detached from the Launch Package allowing the Launch Package to exit the centrifuge.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and other changes can be made without departure from the scope of what is claimed. The following detailed description is therefore not to be taken in a limiting sense, and the scope is defined by the appended claims and their equivalents.

Here, we have devised a system that uses Flux-Pinning to provide Remote Structural Reinforcement to a Superconducting Centrifugal Launcher. In this paired arrangement between the Levitator (i.e. the spinning launch platform) and the Centrifuge (i.e. the stationary base), the centrifuge is composed largely of the reinforced permanent cylindrical magnet while the Levitator is composed largely of reinforced HTSC. Upon reaching its critical temperature, the HTSC is able to form flux-pinned bonds, called Vortices, with the cylindrical permanent magnet. —The pair becomes three dimensionally suspended with one levitating a distance from the other. Furthermore, when properly oriented within the permanent cylindrical magnet's axially symmetric field, the pair form a frictionless hinge; whereas, one of the pair can be made to spin around the other using a contactless electromagnetic motor/generator. As such, they form the basis for a frictionless, non-contacting centrifuge.

[Both the electromagnetic motor and the permanent magnet components may be superconducting as well to improve the versatility of the platform).

Furthermore, this centrifuge utilizes the Vortices to produce Remote Structural Reinforcement of the Levitator. In this paradigm, layers of reinforcement strengthen the permanent magnet; and by strengthening the magnet, this system increases the load that the Levitator can transfer to the magnet via the Vortices. Hence, this reinforcement—with sufficiently strong Vortices—allows the magnet to keeps the Levitator in place despite any torque, drag or friction exerted on it by the centrifugal forces that inevitably result from a centrifuge's operation. This systems allows for the continual strengthening of Levitator without the need to add any additional mass to the actual Levitator's construction. Instead, any additional mass can be exclusively added to the magnetic base within the centrifuge.

Upon reaching the desired launch speed, the Levitator can be released through the ceasing of superconductivity. This can be achieved the any number of triggers (thermodynamic or otherwise) which will disrupt the superconductivity of the HTSC embedded within the Levitator.

In sum, Remote Structural Reinforcement offers a solution that allows for the Superconducting Centrifugal Launcher to support increased rotational speeds, without the need to increase the actual mass of the Levitator with reinforcement.

Flux-Pinning Explained:

Flux-Pinning: High Temperature Superconductors (HTSC) have defects in their crystal lattices called Pinning Sites. If these Pinning Sites are exposed to a magnetic field of sufficient strength, the defects will allow the magnetic field to partially penetrate the HTSC; thereby, pinning the magnetic flux in place. This penetration appears in the form of cylindrical columns of swirling flux, called Vortices, which strongly bond the HTSC to the magnet. This process of bonding the HTSC to the magnet is called Flux Pinning (and is sometimes referred to as Quantum Locking).

And these Vortices form a contactless bond that requires no physical contact between the HTSC and magnet, demonstrated in the levitation of a HTSC above a magnet (or vice versa) upon the pair becoming flux-pinned to one another. As a superconductor, the HTSC resists any changes to the magnetic flux captured within its Pinning Sites; this resistance manifests itself as a force of friction, torque or drag opposed to the direction of motion that would disrupt the flux distribution. This resistance is not incidental; and it can support a weight that is a several thousand times the weight of the engaged HTSC.

Although Flux-Pinning can exert restraining forces in all six degrees of freedom, an interface can be designed to constrain only certain degree) of freedom so that it functions as a non-contacting kinematic joint. To construct such a joint, one must design a path-of-motion—along the desired degree(s) of freedom—that precipitates no change in the magnetic flux within the superconductor's volume. Such a joint allows the two non-contacting modules to move in relation to each other, while remaining effectively constrained in the remaining degrees of freedom. And apart from the cooling demands, flux-pinned joints require no power, lubricant or physical contact; while providing potentially limitless stiffness and remaining essentially impervious to mechanical wear.

Flux-Pinning to produces several categorical advantages for our kinetic launcher. These advantages include:

Frictionless Movement—Levitation is by far the most common demonstration of Flux Pinning's contactless quantum bonds. And our launcher utilizes this phenomenon to replace traditional launch components with those of the contactless variety—eliminating the possibility of friction or physical wear. For example, the payload is levitated by Flux Pinning as a contactless electromagnetic motor articulates it along the circular track. Furthermore, the centrifuge—itself—is sealed within a vacuum chamber allowing the payload to reach hypersonic speeds entirely free from any air resistance. Upon release of the payload, the vacuum chamber can be opened.

Contactless Stabilization—Flux Pinning can produce a frictionless kinematic joint that requires no power, lubricant or physical contact while remaining indefinitely impervious to mechanical wear. This joint, often referred to as Frictionless Hinge, stabilizes the payload along a defined orbit (or track) within the centrifugal launcher. Ultimately, this contactless hinge eliminates the need for any physical tether.

Remote Structural Reinforcement—These contactless quantum bonds also provide a reenforcing mechanism against centrifugal stress. During the centrifuge's operation, any centrifugal force (exerted against the payload) is transferred via the quantum bonds to the magnetic surface. Whereby, our magnetic surface (already embedded with layers of composite reinforcement) absorbs and dissipates this force along the centrifuge's chamber. In this manner, our design provides contactless reinforcement to the articulating payload eliminating the need for any onboard reinforcement. And by proving contactless reinforcement, this design increases the centrifuge's maximum angular velocity allowing it to operate at hypersonic speeds.

Increasing Vortices Strength and Distribution:

The magnet and the Levitator (HTSC) must be bonded in extremely close proximity to one another. Proximity greatly amplifies the accessibility to the magnetic flux, strengthening the Vortices, as well as the homogeneous distribution of the Vortices throughout both HTSC and the magnet.

Vortices should be homogeneously distributed through Levitator's embedded HTSC materials. A sparseness in the distribution of Vortices would create a sort of "weak-link" as it pertains to the Remote Structural Reinforcement being offered to the Levitator by the system.

Highly Reinforced HTSC:

Reinforcement material should be very strong, light weight and thinly layered; most importantly these materials must not block magnetic flux from magnet and must not interfere with the superconductivity of the various components. Thinly layered HTSC materials have several advantages including an increased the ability trap magnetic flux, which ultimately increases the strength and number of trapped Vortices. Bulk HTSC materials can produce magnetic interference upon becoming sufficiently dense; as such, thinly layered HTSC may prevent this phenomenon while increasing the surface area available for Pinning-Sites (i.e. the location of Vortices formation in the Levitator). It is advantageous to assemble the Levitator by overlapping thin layers of HTSC between thin layers of reinforcement materials. While a Levitator may be composed largely of a bulk HTSC; it is preferable to construct a Levitator with ultra thin layers of HTSC and reinforcement. Levitator is composed in this fashion to form ultra thin HTSC layers, which are separated from one another. The thinness and separation aids reducing the superconductors' resistance to and interference with magnetic fields. It also strengthens the HTSC materials for handling during construction as well as within FESS operation.

Superconducting-Permanent-Cylindrical-Magnets:

Superconducting-Permanent-Magnets are a form of permanent magnet composed of superconducting materials. (Superconducting materials must be maintained with their appropriate temperature parameters so as to maintain their superconducting properties (i.e. critical temperature)). Superconducting-Permanent-Magnets have an increased dipole moment, which amplifies the amount of magnetic flux available to form Vortices. The permanent magnets are sometimes fabricated by taking either a type 1 or type 2 superconducting materials and forming a short circuit (or loop), which is then brought to its critical temperature and imbued with a magnetic field. Once established, this magnetic field is retained so long as the superconductivity is maintained. It is important to note that the magnet's critical strength should not be so great that it might interfere with the ability to form Vortices (or that it might interfere with the superconductivity of some other component).

Elimination of Friction:

By creating a system composed of largely contactless components, we allow for the elimination of various sources of friction.

Flux-Pinning allows for the creation of a contactless hinge by which the Levitator can spin suspended in place without contact to centrifuge. This is effectively a frictionless-hinge that will never wear down, require maintenance, energy or even lubrication so long as the superconducting conditions are maintained.

Contactless motor/generator elements can be placed within both Levitator and/or centrifuge. These elements will allow electricity to power the spinning of the Levitator though electromagnetic propulsion; thereby, increasing its rotational energy.

By placing both the Levitator and the centrifuge's magnetic base within a vacuum chamber and by removing the air (whether completely or partially), we can further eliminate the possibility of friction caused by air resistance during flywheel's operation. This chamber can be opened prior to launch to release the payload.

Insulation:

By reducing (or even eliminating) any contact with various forms of matter and light, this system can be insulated so as to maintain the cryogenic temperatures of its superconducting components with minimal refrigeration.

All of the superconducting components of the centrifuge could be stored within a flux-pinned container that is essentially suspended within a insulated vacuum chamber.

Furthermore, by placing the centrifuge into a vacuum chamber and removing the air, we can eliminate an transmission of heat through contact with gaseous matter.

Nonetheless, even in the absence of matter, heat can still be transmitted through a vacuum via infrared light. However, this can be abated through the pairing of surfaces that are either reflective or absorptive of infrared light. The outermost shell of the suspended centrifuge chamber could be made reflective of infrared light while the innermost surface of the vacuum chamber where the centrifuge is stored and suspended, could be made highly absorptive of infrared light. As such the vacuum chamber would absorb far more infrared heat from the centrifuge than it would transmit to the centrifuge.

Reducing Turbulence:

The introduction of Adaptive Suspension and Active Gimbal Systems will reduce the effects of any movements/turbulence.

An Adaptive Suspension utilizing an electronically controlled system (with machine learning) could adapt to conditions and protect centrifuge from any damaged cause by movements outside of the system.

By placing the system within a gimbal container anchored to an electronically controlled gimbal, the centrifuge will remain in the optimal position.

Thermodynamic Trigger(s):

A High Temperature Superconductor (HTSC) must maintain its critical temperature in order to preserve its superconducting state. Any increase in temperature will terminate its superconductivity as well as the Flux Pinning capabilities that depend on it. As such, our kinetic launch design relies upon a Thermodynamic Trigger that will release the payload from the launcher. Once activated this trigger will instantaneously warm the HTSC above its critical temperature; thereby ceasing all superconductivity as well as the Flux Pinning capabilities that depend on it. The subsequent interruption of these quantum bonds will release the payload from the Centrifugal Launcher.

The electro-caloric effect is a thermodynamic phenomenon in which a material exhibits the ability to undergo a temperature change upon having an electrical current applied to it. Analogously, the magneto-caloric effect is a thermodynamic phenomenon in which a material exhibits the ability to undergo a temperature change upon being exposed to a magnetic field. Once triggered, the molecules (within either of these respective substances) become increasingly aligned. And this alignment, turns either material into a far more efficient heat sink. As a result, the materials appear cooler while under the influence of the triggers' effects. The temperature change, elicited in either of these materials, is entirely reversible upon the abatement of the trigger—electrical or magnetic respectively. Yet, what makes these phenomena especially remarkable is the speed at which their temperature changes can be induced (or reversed). And this speed makes either material a prime candidate for use in our platform.

Electro-caloric or magneto-caloric materials will be embedded within the superconducting layers of the Launch Vehicle as a form of Thermodynamic Trigger. The trigger will be activated prior to cooling the HTSC to its critical temperature. Once the payload reaches its the desired speeds and trajectory, the trigger will be de-activated by a wireless remote. Once deactivated the triggers will adjust the HTSC temperature above its critical temperature ceasing its superconductivity. (For certain interactions, the trigger can be reactivated returning the HTSC to its superconducting state/temperature).

LaunchTube as an Advancement of EMRG Technology:

LaunchTube Technology—whether in the form of a linear tube, a spiral, a stacked spiral, or a hybrid of the three—has some distinct similarities with an Electromagnetic Rail Gun (EMRG) Technology. Yet, the LaunchTube has several clear advantages. First, the LaunchTube utilities the Flux-Pinning as a means of (i) eliminating friction and (ii) providing remote structural reinforcement. Second, the LaunchTube allows for far more surface area for the track or runway on which the Launch Vehicle would accelerate in the EMRG. And the spirals allow the LaunchTube to place this runway in an incredible condensed package. Ultimately, this increased surface areas allows us to reduce the amount of strain (or G-Forces) on the Launch Vehicle while it accelerates to final launch speed. Essentially, we can distribute these G-forces over the longer path.

Encasing Reinforcement and Embedded Reinforcement:

[Note for the purposes of this 'Encasing Reinforcement and Embedded Reinforcement' summary references to the stator refer to the magnetic surfaces within the Superconducting Centrifuge while references to the rotor refer to the HTSC material within the Levitator].

Reinforcement of the stator is necessary; since it is the stator that will be absorbing the centrifugal stress from the rotor via the flux pinning interaction (i.e. Vortices). As such, the stator may be reinforced in two ways, using: Encasing Reinforcement as well as Embedded Reinforcement.

Encasing Reinforcement is reinforcement material that surrounds the materials undergoing flux pinning; hence, it is reinforcement that would surround either the permanent cylindrical magnet or the Levitator's HTSC.

Embedded Reinforcement is the reinforcement material that would be either (i) layered thinly between thin layers of the materials undergoing flux pinning or (ii) deposited within the materials undergoing flux pinning (potentially in a caged fashion similar to steel rebar reinforcing a concrete foundation). And since the centrifugal stress typically manifest as a lateral pressure, each layer of reinforcement should be layered laterally (i.e. left to right, so to speak, rather than vertically one above the other) in a series of concentric rings.

The stator would benefit from both of these paradigms (Encasing Reinforcement and Embedded Reinforcement) being used simultaneously. Yet, Encasing Reinforcement is most necessary. Additionally, both Encasing Reinforcement as well as Embedded Reinforcement should be positioned so as to reinforce the flux pining material in the stator from centrifugal stress during the centrifuge's operation. Importantly, the centrifugal stress typically manifest as a lateral pressure. As such, Encasing Reinforcement should be arranged with its lateral reinforcement on the outermost rim of the stator; while Embedded Reinforcement should also have laterally oriented reinforcement layers (or rebar cages) woven between the flux pinning materials of the stator.

Example of Possible Embedded Reinforcement of Stator:

Embedded Reinforcement of a stator could take the form of layers of interlocking-rebar-cages of reinforcement within a cylindrical magnetic mass. And these interlocking-rebar-cages should layered be layered laterally (i.e. left to right, so to speak, rather than vertically one above the other) within the magnetic mass. Please note that reinforcement could be composed of any number of materials (e.g. carbon fiber) so long as said reinforcement material (i) does not inhibit the magnet field, or (ii) separate a portion of the magnet from itself so as to change the overall magnetic field strength or magnetic field shape or even its nature as a cylindrical permanent magnet.

Example of Possible Encasing Reinforcement of Stator:

The outermost shell (or layers) stator could be composed of reinforcement. This would literally form a rim or boundary holding the stator in place. (Somewhat like a tire surrounding a wheel). This outermost rim of reinforcement would act like a dam keeping the centrifugal stress from bursting through the stator material. The Encasing reinforcement doesn't necessarily require covering the top or bottom of the stator; since the centrifugal stress is attacking from the sides. In fact, in some instances it might be preferable to leave top and bottom reinforcement absent so as to increase the stator's proximity to the rotor.

Reinforcement for the rotor is somewhat optional. Since the rotor could theoretically be composed entirely of a flux-pinned material, which ultimately is receiving sufficient reinforcement from the Vortices to deal with all stresses (centrifugal or otherwise). However, when reinforcement is added to the rotor it should be a form of Embedded Reinforcement. Encasing Reinforcement is less desirable; on account, that the Encasing Reinforcement is by its nature on the outside of the rotor. Furthermore, it is not engaged in any flux pinning interactions. As such, said Encasing Reinforcement will only have its own tensile strength to gird it against the centrifugal stress of centrifuge's operation. This might cause it to fail (as a material) at lower velocities than the actual rotor materials (i.e. HTSC) undergoing flux-pinning. As such, any reinforcement added to the rotor, that will not itself be flux pinned, must be added in a manner in which it is embedded within (i.e. closer to the center of the rotor than) other materials in the rotor that will be undergoing flux pinning.

Examples for Embedded Reinforcement of rotor:

Each layer of reinforcement—within a Levitator based rotor—should be layered laterally (i.e. left to right, so to speak, rather than vertically one above the other) between layers of HTSC in concentric rings.—And the outermost layers of the should be composed of HTSC.

Both Embedded and Encasing Reinforcement should be distinguished from the basic HTSC composition. It is preferable to construct a Levitator with ultra thin layers of HTSC and reinforcement (whether Embedded or Encasing. Levitator is composed in this fashion to form ultra thin HTSC layers, which are separated from one another. The thinness and separation aids reducing the superconductors' resistance to and interference with magnetic fields. It also strengthens the HTSC materials for handling during construction as well as within Centrifuge operation.

Additionally, since the centrifugal stress typically manifest as a lateral pressure, each layer of reinforcement should be layer laterally (i.e. left to right, so to speak, rather than vertically one above the other) in a series of concentric rings. Additionally, these layers can take the form of cages of rebar.

FIG. 1A illustrates a front/cross-section view of a cylindrical magnet with its magnetic field lines. The Orbital Pattern 135 (i.e. homogeneous patterns of flux above the magnet that have been produced by the Surface Image within the magnetic surface) has also been illustrated here. And the Surface Image 140 (i.e. the pattern created as the magnetic field emanates from the surface of the magnet's pole) has also been illustrated here.

FIG. 1B illustrates a 3/4 front/top view of a cylindrical magnet with its magnetic field lines. The Orbital Pattern 135 (i.e. homogeneous patterns of flux above the magnet that have been produced by the Surface Image within the magnetic surface) has also been illustrated here. And the Surface Image 140 (i.e. the pattern created as the magnetic field emanates from the surface of the magnet's pole) has also been illustrated here.

FIG. 1C illustrates a 3/4 front/top view of a cylindrical magnet with a particular selection of its magnetic field lines. The Orbital Pattern 135 (i.e. homogeneous patterns of flux above the magnet that have been produced by the Surface Image within the magnetic surface) has also been illustrated here. And the Surface Image 140 (i.e. the pattern created as the magnetic field emanates from the surface of the magnet's pole) has also been illustrated here.

FIG. 1C illustrates a 3/4 front / top view of a cylindrical magnet with a particular selection of its magnetic field lines.The Orbital Pattern 135 (i.e. homogeneous pattens of flux above the magnet that have been produced by the Surface Image within the magnetic surface) has also been illustrated here. And the Surface Image 140 (i.e. the pattern created as the magnetic field emanates from the surface of the magnet's pole) has also been illustrated here.

FIG. 2A is a 3/4 view of front/top of the cylindrical magnet; where a Levitator is flux-pinned to the magnet's upper portion. This illustration demonstrates how the Levitator, which is composed of High Temperature Superconductor (HTSC), forms flux-pinned bonds (called Vortices) with the magnet. The Levitator is free to spin about the magnet's dipole axis, remaining at a constant radius from the dipole center. As such, the Levitator is fixed in every degree of freedom except for its rotation about magnet's axis of symmetry (i.e. magnet's dipole axis). This paradigm allows the Levitator 2000 to travel in a circular motion (clockwise or counter clockwise) about the Activated Orbital 2010. Notice that the motions illustrated here produce no torque or resistance from the Vortices 2005; the bonds are maintained throughout the action. Notice how the Vortices extend from the Activated Orbital to the Activated Image 2015 illustrated on the surface of the magnet. The Activated Image is the portion of the magnet that corresponds to the homogeneous flux required for there to be certain unrestricted degrees of freedom—in this case a circular motion about the magnet's dipole axis.

FIG. 2B is a 3/4 view of front/top of the cylindrical magnet. This illustration demonstrates the types of motion which are prohibited by the Vortices in this paradigm. The magnet has an axially symmetric magnetic field; as such, the Levitator is fixed in every degree of freedom except for its rotation about magnet's axis of symmetry (i.e. magnet's dipole axis). This paradigm allows the Levitator to travel in a circular motion about the Activated Orbital. Here, we examine the effects of traveling in a longitudinal(upward) motion 2025 on the Vortices. Notice that the motions illustrated here actually produce torque or resistance from the Vortices—resulting in the Vortices being broken 2040 during the action. Notice how the Vortices previously extended from the Activated Orbital to the Activated Image 2015 illustrated on the surface of the magnet.

FIG. 2C is a 3/4 view of front/top of the cylindrical magnet. This illustration demonstrates the types of motion which are prohibited by the Vortices in this paradigm. The magnet has an axially symmetric magnetic field; as such, the Levitator 2000 is fixed in every degree of freedom except for its rotation about magnet's axis of symmetry (i.e. magnet's dipole axis). This paradigm allows the Levitator to travel in a circular motion about the Activated Orbital 2010. Here, we examine the effects of traveling in a longitudinal (downward) 2055 motion on the Vortices. Notice that the motions illustrated here actually produce torque or resistance from the Vortices—resulting in the flux-pinned bonds being broken 2040 during the action. Notice how the Vortices previously extended from the Activated Orbital to the Activated Image 2015 illustrated on the surface of the magnet.

FIG. 3A is a 3/4 view of front/top of the cylindrical magnet; where a Levitator is flux-pinned to the magnet's upper portion. This illustration demonstrates how the Levitator, which is composed of High Temperature Superconductor (HTSC), forms flux-pinned bonds (called Vortices) with the magnet. The Levitator is free to spin about the magnet's dipole axis, remaining at a constant radius from the dipole center. As such, the Levitator is fixed in every degree of freedom except for its rotation about magnet's axis of symmetry (i.e. magnet's dipole axis). This paradigm allows the Levitator 2070 to travel in a circular motion (clockwise or counter clockwise) about the Activated Orbital 2080. Notice that the motions illustrated here produce no torque or resistance from the Vortices 2075; the bonds are maintained throughout the action. Notice how the Vortices extend from the Activated Orbital to the Activated Image 2085 illustrated on the surface of the magnet. The Activated Image is the portion of the magnet that corresponds to the homogeneous flux required for there to be certain unrestricted degrees of freedom—in this case a circular motion about the magnet's dipole axis.

FIG. 3B is a 3/4 view of front/top of the cylindrical magnet. This illustration demonstrates the types of motion which are prohibited by the Vortices in this paradigm. The magnet has an axially symmetric magnetic field; as such, the Levitator is fixed in every degree of freedom except for its rotation about magnet's axis of symmetry (i.e. magnet's dipole axis). This paradigm allows the Levitator 2070 to travel in a circular motion about the Activated Orbital. Here, we examine the effects of traveling in a latitudinal (sideways) motion 2090 on the Vortices. Notice that the motions illustrated here actually produce torque or resistance from the Vortices—resulting in the Vortices being broken 2110 during the action. Notice how the Vortices previously extended from the Activated Orbital 2080 to the Activated Image 2085 illustrated on the surface of the magnet. Notice the Levitator/Vortices' previous position prior to movement 2105.

FIG. 3C is a 3/4 view of front/top of the cylindrical magnet. This illustration demonstrates the types of motion which are prohibited by the Vortices in this paradigm. The magnet has an axially symmetric magnetic field; as such, the Levitator is fixed in every degree of freedom except for its rotation about magnet's axis of symmetry (i.e. magnet's dipole axis). This paradigm allows the Levitator 2070 to travel in a circular motion about the Activated Orbital. Here, we examine the effects of traveling in a latitudinal (sideways) motion 2125 on the Vortices. Notice that the motions illustrated here actually produce torque or resistance from the Vortices—resulting in the Vortices being broken 2130 during the action. Notice how the Vortices previously extended from the Activated Orbital 2080 to the Activated Image 2085 illustrated on the surface of the magnet. Notice the LevitatorNortices' previous position prior to movement 2105.

FIG. 4A is a 3/4 view of front/top of the cylindrical magnet; where a Levitator 2150 is flux-pinned to the magnet's upper portion. This illustration demonstrates how the Levitator, which is composed of High Temperature Superconductor (HTSC), forms flux-pinned bonds (called Vortices) with the magnet. The Levitator is free to spin about the magnet's dipole axis, remaining at a constant radius from the dipole center. As such, the Levitator is fixed in every degree of freedom except for its rotation about magnet's axis of symmetry (i.e. magnet's dipole axis). This paradigm allows the Levitator to travel in a circular motion (clockwise or counter clockwise) about the Activated Orbital 2155. Notice that the motions illustrated here produce no torque or resistance from the Vortices 2060; the bonds are maintained throughout the action. Notice how the Vortices extend from the Activated Orbital to the Activated Image 2165 illustrated on the surface of the magnet. The Activated Image is the portion of the magnet that corresponds to the homogeneous flux required for there to be certain unrestricted degrees of freedom—in this case a circular motion about the magnet's dipole axis.

FIG. 4B is a 3/4 view of front/top of the cylindrical magnet; where a Levitator 2150 is flux-pinned to the magnet's upper portion. This illustration demonstrates how the Levitator, which is composed of High Temperature Superconductor (HTSC), forms flux-pinned bonds (called Vortices) with the magnet. The Levitator is free to spin about the magnet's dipole axis, remaining at a constant radius from the dipole center. As such, the Levitator is fixed in every degree of freedom except for its rotation about magnet's axis of symmetry (i.e. magnet's dipole axis). This paradigm allows the Levitator to travel in a circular motion (counter clockwise) about the Activated Orbital 2155. Notice that the motions illustrated here produce no torque or resistance from the Vortices 2060; the bonds are maintained throughout the action. Notice how the Vortices extend from the Activated Orbital to the Activated Image 2165 illustrated on the surface of the magnet. The Activated Image is the portion of the magnet that corresponds to the homogeneous flux required for there to be certain unrestricted degrees of freedom—in this case a circular motion about the magnet's dipole axis. Notice the Levitator/Vortices' previous position prior to movement 2190.

FIG. 4C is a 3/4 view of front/top of the cylindrical magnet; where a Levitator 2150 is flux-pinned to the magnet's upper portion. This illustration demonstrates how the Levitator, which is composed of High Temperature Superconductor (HTSC), forms flux-pinned bonds (called Vortices) with the magnet. The Levitator is free to spin about the magnet's dipole axis, remaining at a constant radius from the dipole center. As such, the Levitator is fixed in every degree of freedom except for its rotation about magnet's axis of symmetry (i.e. magnet's dipole axis). This paradigm allows the Levitator to travel in a circular motion (clockwise) about the Activated Orbital 2155. Notice that the motions illustrated here produce no torque or resistance from the Vortices 2060; the bonds are maintained throughout the action. Notice how the Vortices extend from the Activated Orbital to the Activated Image 2165 illustrated on the surface of the magnet. The Activated Image is the portion of the magnet that corresponds to the homogeneous flux required for there to be certain unrestricted degrees of freedom—in this case a circular motion about the magnet's dipole axis. Notice the Levitator/Vortices' previous position prior to movement 2220.

FIG. 5A is a 3/4 view of front/top of the cylindrical magnet; where a Levitator 2230 is flux-pinned to the magnet's upper portion. In this series, we will explore how this system can be used to spin the Levitator in a circular pattern along the homogenous flux produced by Activated Orbital. Furthermore, these Vortices can be purposely broken—if only for a brief period—allowing the Levitator to move from its original Activated Orbital to a new orbital pattern of greater radius from the dipole axis. Once the Levitator has moved to a new Activated Orbital of greater radius than its original. The Vortices are reactivated, through abating any applied heat, magnetic interference, thermodynamic triggers et al, which previously inhibited flux pinning interactions. In this way, the system acts as a sort of sling (momentarily) and then as a form of net to catch the Levitator once again. Remarkably, after these various interactions the kinetic energy/centrifugal force of the system is maintained within the new Activated Orbital.

This particular illustration demonstrates how the Levitator, which is composed of High Temperature Superconductor (HTSC), forms flux-pinned bonds (called Vortices 2240) with the magnet. The Levitator is free to spin about the magnet's dipole axis, remaining at a constant radius from the dipole center. As such, the Levitator is fixed in every degree of freedom except for its rotation about magnet's axis of symmetry (i.e. magnet's dipole axis). This paradigm allows the Levitator to travel in a circular motion (clockwise 2255) about the Activated Orbital 2245. Notice that the motions illustrated here produce no torque or resistance from the Vortices 2240; the bonds are maintained throughout the action. Notice how the Vortices extend from the Activated Orbital to the Activated Image 2250 illustrated on the surface of the magnet. The Activated Image is the portion of the magnet that corresponds to the homogeneous flux required for there to be certain unrestricted degrees of freedom—in this case a circular motion about the magnet's dipole axis. Notice the Levitator/Vortices' previous position prior to movement 2235.

The Levitator is moved by a contactless electromagnetic motor (not illustrated). Each Levitator contains a magnetic element that can be modulated by said motor.

FIG. 5B is a 3/4 view of front/top of the cylindrical magnet; where a Levitator 2230 was previously flux-pinned to the magnet's upper portion. FIG. 5B illustrates the Vortices being purposely broken 2270—if only for a brief period—allowing the Levitator 2230 to move from its original Activated Orbital 2245 to a new orbital pattern of greater radius than its originals. Notice how the Vortices extend from the Activated Orbital to the Activated Image 2250 illustrated on the surface of the magnet. Notice additionally the Vortices may be deactivated by various means which may include but are not limited to the heating Levitator's superconducting element above critical temperature or through magnetic manipulation of the said superconducting element as well as various electro-caloric / magneto-caloric triggers (see thermodynamic triggers previously discussed).

FIG. 5C is a 3/4 view of front/top of the cylindrical magnet; where a Levitator 2230—now released from its Vortices—moves outward 2285 from its original position 2290 towards an orbital of greater radius. Hence, the systems begins to behave (if briefly) like a catapult (or sling) of sorts.

FIG. 5D is a 3/4 view of front/top of the cylindrical magnet; where the Levitator 2230 has moved to a new Activated Orbital 2305 of greater radius than its original. The Vortices 2310 are reactivated, through abating any applied heat, magnetic interference, thermodynamic triggers et al, which previously inhibited flux pinning interactions. As such, the kinetic energy of the Levitator remains preserved causing it to spin 2255 about the magnet's dipole axis once again.

Notice how the Vortices extend from the Activate Orbital to the new Activated Image 2315 upon the magnetic surface.

FIG. 6A is a 3/4 view of front/top of the cylindrical magnet; where a Levitator 2325 is flux-pinned to the magnet's upper portion. Notice how the Vortices 2340 extend from the Activate Orbital 2330 to the new Activated Image 2345 upon the magnetic surface. Further, the Levitator has circulated 2320 (clockwise) from a previous position 2335 to the present one.

The magnet has an axially symmetric magnetic field; as such, the Levitator is fixed in every degree of freedom except for its rotation about magnet's axis of symmetry (i.e. magnet's dipole axis). This paradigm allows the Levitator to travel in a circular motion (clockwise) about the Activated Orbital. Notice that the motions illustrated here produce no torque or resistance from the Vortices; the bonds are maintained throughout the action.

In this series, we will explore how this system can be used to spin the Levitator in a circular pattern along the homogenous flux produced by Activated Orbital within the Orbital Pattern. Furthermore, these Vortices can be purposely broken allowing the Levitator to move from its original Activated Orbital. In this way, the system acts as a sling or catapult of sorts.

FIG. 6B is a 3/4 view of front/top of the cylindrical magnet; where a Levitator 2325 was previously flux-pinned to the magnet's upper portion. FIG. 6B illustrates the Vortices being purposely broken 2365—if only for a brief period—allowing the Levitator to move from its original Activated Orbital 2330.

Notice additionally the Vortices may be deactivated by various means which may include but are not limited to the heating Levitator's superconducting element above critical temperature or through magnetic manipulation of the said superconducting element as well as various electro-caloric / magneto-caloric triggers (see thermodynamic triggers previously discussed).

FIG. 6C is a 3/4 view of front/top of the cylindrical magnet; where a Levitator 2325—freed from the vortices—begins moving outward. Once the Vortices have been deactivated, via thermodynamic triggers or the like, the Levitator then begins moving outward 2380 away from its previous position 2385. As such, this behave like a catapult (or sling) of sorts.

FIG. 7A is a 3/4 view of front/top of the cylindrical magnet; where 3 Levitators (1st Levitator 2395, 2nd Levitator 2415, 3rd Levitator 2420) are flux-pinned to the magnet's upper portion.

In this series, we will explore how this system can be used to spin several Levitators in a circular pattern along the homogenous flux produced by Activated Orbital. Furthermore, the Vortices connected to a single Levitator can be purposely broken allowing that Levitator to move from its original Activated Orbital. In this way, the system acts as a form of sling or catapult of sorts; while the remaining Levitator's can remain engage to their respective Vortices. After the escape of the single Levitator, the remaining engaged Levitators can adjust their speed and position with respect to one another in order to rebalance the centrifugal forces of the system.

This particular illustration demonstrates how each Levitator—composed of High Temperature Superconductor (HTSC)—forms flux-pinned bonds (called Vortices 2405)

with the magnet. Each Levitator is free to spin 2390 about the magnet's dipole axis, remaining at a constant radius from the dipole center. As such, each Levitator is fixed in every degree of freedom except for its rotation about magnet's axis of symmetry (i.e. magnet's dipole axis). This paradigm allows each Levitator to travel in a circular motion (clockwise) about the Activated Orbital 2400. Notice that the motions illustrated here produce no torque or resistance from the Vortices; the bonds are maintained throughout the action. Notice how the Vortices extend from the Activated Orbital to the Activated Image 2410 illustrated on the surface of the magnet. The Activated Image is the portion of the magnet that corresponds to the homogeneous flux required for there to be certain unrestricted degrees of freedom—in this case a circular motion about the magnet's dipole axis.

The Levitator is moved by a contactless electromagnetic motor (not illustrated). Each Levitator contains a magnetic element that can be modulated by said motor.

FIG. 7B is a 3/4 view of front/top of the cylindrical magnet; where 2 Levitators (2nd Levitator 2415, 3rd Levitator 2420) are flux-pinned to the magnet's upper portion; whereas the 1st Levitator 2395 was previously flux-pinned to the magnet's upper portion. FIG. 7B illustrates its Vortices being purposely broken 2435—if only for a brief period— allowing the Levitator to move from its original Activated Orbital 2400. In this way, the system acts as a form of sling or catapult of sorts; while the remaining Levitator's can remain engage to their respective Vortices. Notice how the Vortices extend from the Activated Orbital to the Activated Image 2410 illustrated on the surface of the magnet.

Notice additionally the Vortices may be deactivated by various means which may include but are not limited to the heating Levitator's superconducting element above critical temperature or through magnetic manipulation of the said superconducting element as well as various electro-caloric / magneto-caloric triggers (see thermodynamic triggers previously discussed).

FIG. 7C is a 3/4 view of front/top of the cylindrical magnet; where 2 Levitators (2nd Levitator 2415, 3rd Levitator 2420) are flux-pinned to the magnet's upper portion; whereas the 1st Levitator 2395 moves away from the magnet's upper portion. FIG. 7C illustrates its Vortices being purposely broken 2435—if only for a brief period—allowing the Levitator to move outward 2465 from its original Activated Orbital 2400. In this way, the system acts as a form of sling or catapult of sorts; while the remaining Levitator's can remain engage to their respective Vortices and continue to circulate 2390. Notice how the Vortices extend from the Activated Orbital to the Activated Image 2410 illustrated on the surface of the magnet.

FIG. 7D is a 3/4 view of front/top of the cylindrical magnet; where 2 Levitators (2nd Levitator 2415, 3rd Levitator 2420) are flux-pinned to the magnet's upper portion; whereas after the escape of the single Levitator, the remaining engaged Levitators can adjust their speed and position with respect to one another in order to rebalance the centrifugal forces of the system.

This particular illustration demonstrates how each Levitator —composed of High Temperature Superconductor (HTSC)—forms flux-pinned bonds (called Vortices 2450 and 2440) with the magnet. Each Levitator is free to spin 2390 about the magnet's dipole axis, remaining at a constant radius from the dipole center. As such, each Levitator is fixed in every degree of freedom except for its rotation about magnet's axis of symmetry (i.e. magnet's dipole axis). This paradigm allows each Levitator to travel in a circular motion (clockwise) about the Activated Orbital 2400. Notice that the motions illustrated here produce no torque or resistance from the Vortices; the bonds are maintained throughout the action. Notice how the Vortices extend from the Activated Orbital to the Activated Image 2410 illustrated on the surface of the magnet. The Activated Image is the portion of the magnet that corresponds to the homogeneous flux required for there to be certain unrestricted degrees of freedom—in this case a circular motion about the magnet's dipole axis.

FIG. 8A is a 3/4 view of front/top of the cylindrical magnet; where 3 Levitators (1st Levitator 2555, 2nd Levitator 2550, 3rd Levitator 2545) are flux-pinned to the magnet's upper portion. In this series, we will explore how this system can be used to spin 2540 several Levitators in a circular pattern along the homogenous flux produced by Activated Orbital. Furthermore, the Vortices connected to all three Levitators can be purposely broken allowing these Levitators to move from their original Activated Orbital. In this way, the system acts as a form of sling or catapult of sorts.

This particular illustration demonstrates how each Levitator—composed of High Temperature Superconductor (HTSC)—forms flux-pinned bonds (called Vortices) with the magnet. Each Levitator is free to spin 2540 about the magnet's dipole axis, remaining at a constant radius from the dipole center. As such, each Levitator is fixed in every degree of freedom except for its rotation about magnet's axis of symmetry (i.e. magnet's dipole axis). This paradigm allows each Levitator to travel in a circular motion (clockwise) about the Activated Orbital 2560. Notice that the motions illustrated here produce no torque or resistance from the Vortices; the bonds are maintained throughout the action. Notice how the Vortices extend from the Activated Orbital to the Activated Image 2535 illustrated on the surface of the magnet. The Activated Image is the portion of the magnet that corresponds to the homogeneous flux required for there to be certain unrestricted degrees of freedom—in this case a circular motion about the magnet's dipole axis.

The Levitator is moved by a contactless electromagnetic motor (not illustrated). Each Levitator contains a magnetic element that can be modulated by said motor.

FIG. 8B is a 3/4 view of front/top of the cylindrical magnet; where 3 Levitators (1st Levitator 2555, 2nd Levitator 2550, 3rd Levitator 2545) were previously flux-pinned to the magnet's upper portion. FIG. 8B illustrates its Vortices being purposely broken (1st's Vortices 2590, 2nd's Vortices 2570, 3rd's Vortices 2595)—if only for a brief period— allowing the Levitators to move from their original Activated Orbital 2560. In this way, the system acts as a form of sling or catapult of sorts. Notice how the Vortices previously extended from the Activated Orbital to the Activated Image 2535 illustrated on the surface of the magnet.

Notice additionally the Vortices may be deactivated by various means which may include but are not limited to the heating Levitator's superconducting element above critical temperature or through magnetic manipulation of the said superconducting element as well as various electro-caloric / magneto-caloric triggers (see thermodynamic triggers previously discussed).

FIG. 8C is a 3/4 view of front/top of the cylindrical magnet; where 3 Levitators (1st Levitator 2555, 2nd Levitator 2550, 3rd Levitator 2545) were previously flux-pinned to the magnet's upper portion.; whereas all 3 Levitators move away (1st's direction 2625, 2nd's direction 2610, 3rd's direction 2635) from the magnet's upper portion away from their original respective positions (1st's position 2630, 2nd's position 2620, 3rd's position 2605).

FIG. 9A is a 3/4 view of front/top of the cylindrical magnet; where 2 Levitators (Innermost Levitator 2665, Outermost Levitator 2655) are flux-pinned to the magnet's upper portion. In this series, we will explore how this system can be used to spin several Levitators in a circular pattern along the homogenous flux produced by one of several Activated Orbital(s). Furthermore, the Vortices connected to various Levitators can be purposely broken allowing those Levitators to move away from their original Activated Orbital(s). In this way, the system acts as a form of sling or catapult of sorts. Finally, the Vortices of a single Levitator can be reactivated establishing itself on an Activated Orbital of greater radius than its original. In this way, the system acts as a form of sling momentarily and then as a form of net to catch the Levitator once again. Remarkably, after these various interactions the kinetic energy/centrifugal force of the system is maintained.

This particular illustration demonstrates how each Levitator—composed of High Temperature Superconductor (HTSC)—forms flux-pinned bonds (called Vortices) with the magnet. Each Levitator is free to spin 2650 about the magnet's dipole axis, remaining at a constant radius from the dipole center. As such, each Levitator is fixed in every degree of freedom except for its rotation about magnet's axis of symmetry (i.e. magnet's dipole axis). This paradigm allows each Levitator to travel in a circular motion (clockwise) about the Activated Orbital (Outermost Activated Orbital 2640 and Innermost Activated Orbital 2645). Notice that the motions illustrated here produce no torque or resistance from the Vortices; the bonds are maintained throughout the action. Notice how the Vortices extend from each Activated Orbital to its respective Activated Image (Outermost Activated Image 2675 and Innermost Activated Image 2680) illustrated on the surface of the magnet. The Activated Image is the portion of the magnet that corresponds to the homogeneous flux required for there to be certain unrestricted degrees of freedom —in this case a circular motion about the magnet's dipole axis.

The Levitator is moved by a contactless electromagnetic motor (not illustrated). Each Levitator contains a magnetic element that can be modulated by said motor.

FIG. 9B is a 3/4 view of front/top of the cylindrical magnet; where 2 Levitators (Innermost Levitator 2665, Outermost Levitator 2655) were previously flux-pinned to the magnet's upper portion. FIG. 9B illustrates their Vortices being purposely broken (Innermost Vortices 2710, Outermost Vortices 2715)—if only for a brief period-allowing the Levitators to move from their original Activated Orbitals (Innermost Orbital 2645, Outermost Orbital 2640). In this way, the system acts as a form of sling or catapult of sorts. Notice how the Vortices previously extended from the Activated Orbitals to the Activated Images (Innermost Image 2680, Outermost Image 2675) illustrated on the surface of the magnet.

Notice additionally, the Vortices may be deactivated by various means which may include but are not limited to the heating Levitator's superconducting element above critical temperature or through magnetic manipulation of the said superconducting element as well as various electro-caloric / magneto-caloric triggers (see thermodynamic triggers previously discussed).

FIG. 9C is the Vortices (Flux Pinned Bond)—of various Levitators—has been deactivated causing the Levitators then begin moving outward away from their Activated Orbital(s). Hence, the systems begins to behave like a catapult (or sling) of sorts. —with the Outermost Levitator 2715 has moving outward 2740 beyond its Activated Orbital. The Innermost Levitator has moved to an Activated Orbital of greater radius than its original. Thereupon, the Innermost Levitator 2665 will abate it's thermodynamic triggers allowing its Vortices 2760 to be reactivated. As such, the Innermost Levitator becomes flux-pinned and establishes new Vortices with a new Activated Orbital 2640. The kinetic energy is preserved causing the Innermost Levitator to spin about the magnet's axis once again. Notice how the Vortices extended from the Activated Orbital to the new Activated Image 2675.

FIG. 10A is a 3/4 view of front/top of a Levitator 2785 sandwiched between the two cylindrical magnets. This series demonstrates how a single Levitator may forms Vortices) with several (two) magnets (one magnet above the Levitator and one below the Levitator); furthermore, it demonstrates how the Levitator can travel in a circular pattern 2795 along the homogenous flux produced by Activated Orbitals 2780 produced by either magnet. Both magnets have axially symmetric magnetic field; as such, the Levitator is fixed in every degree of freedom except for its rotation about either magnet's axis of symmetry (i.e. magnet's dipole axis). This paradigm allows the Levitator to travel in a circular motion (clockwise or counter clockwise) about the Activated Orbitals. Notice that the motions illustrated here produce no torque or resistance from the Vortices; the flux bonds are maintained throughout the action.

Notice how the upper Vortices 2775 extend from the Levitator to the upper Activated Image 2770 on the upper magnetic surface. Notice how the lower Vortices 2790 extend from the Levitator to the lower Activated Image 2800 on the lower magnetic surface.

FIG. 10B is a front / cross-section view of the of a Levitator 2785 sandwiched between the two cylindrical magnets. Notice how the upper Vortices 2775 extend from the Levitator to the upper Activated Image 2770 on the upper magnetic surface. Notice how the lower Vortices 2790 extend from the Levitator to the lower Activated Image 2800 on the lower magnetic surface.

FIG. 11A is a 3/4 view of front/top of a thin/hollow cylindrical magnet 2855 with a Levitator flux pinned within its cavity. Here, we will illustrate a Levitator 2835 that is flux-pinned to the side of the inner portion of a hollow cylindrical magnet. Here, the Levitator can perform certain circular motions 2845 with the hallow without any torque, resistance or breaking of Vortices 2840. This is due to the presence of homogeneous flux required for there to be certain unrestricted degrees of freedom—in this case a circular motion about the magnet's dipole axis. We also illustrate a different variety of Activated Orbital 2830, and Activated Image 2850 for this type of flux-pinning to the inner side of the cylindrical magnet.

FIG. 11B is a 3/4 view of front/top of a thin/hollow cylindrical magnet 2855 with a Levitator flux pinned within its cavity. Here, we will illustrate a Levitator 2835 that is flux-pinned to the side of the inner portion of a hollow cylindrical magnet. Here, the Levitator can perform certain circular motions 2845 with the hallow without any torque, resistance or breaking of Vortices 2840. This is due to the presence of homogeneous flux required for there to be certain unrestricted degrees of freedom—in this case a circular motion about the magnet's dipole axis. We also illustrate a different variety of Activated Orbital 2830, and Activated Image 2850 for this type of flux-pinning to the inner side of the cylindrical magnet. Here, we compare the previous position 2870 of the Levitator to its new position after movement.

FIG. 12A illustrates how a Levitator can become Flux-Pinned within the circular tube of a Superconducting Centrifuge. In particular, the Levitator 2980 can form Vortices with the lateral walls of such a tube utilizing interactions discussed in FIG. 11 and FIG. 13. The FIG. 11 interactions explain the Levitator's interactions with outer wall of the tube (relative to the Levitator), while FIG. 13 explains the Levitator's interactions with inner wall of the tube respectively.

In particular, FIG. 12A illustrates a top / cutaway view of the Superconducting Centrifuge with the Levitator within its center waiting to be placed into the launch cavity. Note: the outside surfaces of the Levitator are composed of layers of HTSC. The Levitator itself may also be constructed in a manner of holding a storage compartment for any item due to be launched. The Levitator's systems have the ability to deactivate Vortices created with the Centrifuges walls via various means including Thermodynamic triggers—which temporarily abate superconductivity. Notice also the deactivated version of the Activated Orbital 2975 awaiting a Levitator. Notice further the inner magnetic wall 2970 of the innermost launch tube as well as the outer magnetic wall 2985 of the same.

FIG. 12B illustrates the Levitator 2980 being deposited 2995 into the innermost tube where it has access to the Activated Orbital 2975. Here, we've also noted the previous position 3010 of the Levitator. Further, the access door 3005 (within Magnetic Wall) opens allowing a Levitator Capsule to exit.

FIG. 12C illustrates how the superconducting shell of the Levitator —having reached its critical temperature—allows the Levitator 2980 to form Vortices 2985 with the inner 2970 and outer 2985 magnetic walls of the tube. Thereby activating the Activated Orbital 2975.

FIG. 12D illustrates the movement of the Levitator 2980 in a clockwise fashion 3045 with the innermost tube along the Activated Orbital 2975. The Levitator's previous position 3055 is also noted. The movement of the Levitator is modulated by a contactless electromagnetic motor (not illustrated).

FIG. 12E illustrates the opening 3065 of the outer magnetic wall of the inner tube in preparation for the Levitator's transition. Notice how the Levitator 2980 bonds with the Vortices 3075 are deactivated along the Activated Orbital 2975. The deactivation is modulated by the thermodynamic triggers not illustrated here.

FIG. 12F illustrates the Levitator 2980 moves from its original Activated Orbital and through the Access Door. Eventually, it comes within range of a second Activate Orbital located within the outmost tube. The deactivated version of the Activated Orbital 3095 awaiting a Levitator to activate it. We've also noted the direction 3090 the Levitator Capsule's movement after Vortices have been broken. The previous position 3100 of the Levitator is also noted.

FIG. 12G illustrates the Levitator 2980 returns its shell to its original superconducting state allowing the Levitator to form Vortices 3110 with the inner and outer Magnetic Walls of the tube. Thereby activating the Activated Orbital 3095 outmost tube. Vortices form between the Levitator and the inner and outer magnetic walls of the outer tube.

FIG. 12H illustrates how the momentum generated in prior revolutions allows the Levitator to continue circling the tube at high speeds. Additionally, electromagnetic motors/systems (not illustrated) begin spinning the Levitator at even higher speeds within the tube. The direction the Levitator's movement contribute in counter clockwise 3045 fashion. The previous position 3120 of the Levitator is also noted. Notice how Vortices 3110 are maintained between the Levitator and the inner and outer magnetic walls of the outer tube. The Access Door has also closed.

FIG. 12I illustrates the Access Door 3155 located within outer wall of the tube opens. And the Levitator 2980 deactivates its Vortices 3160 (by modulating/abating the superconductivity of its shell) —deactivating its Activated Orbital 3095 —and allowing it to move away. Vortices (Flux Pinned Bond) have been deactivated via thermodynamic triggers (not illustrated here).

FIG. 12J illustrates the Levitator 2980 moving from its Activated Orbital and through the Access Door. The previous position 3170 of the Levitator is also noted as well as the direction 3175 the Levitator's movement after Vortices have been broken.

FIG. 13A is a 3/4 view of front/top of the cylindrical magnet 2925 with a Levitator 2910 flux pinned to the outer side portion of the magnet. Here, we will illustrate that when the Levitator is flux-pinned to the side of the cylindrical magnet certain circular motions 2900 are now allowed without any torque, resistance or breaking of Vortices 2905. We also illustrate a difference variety of Activated Orbital 2920, and Activated Image 2915 for this type of flux-pinning to the side of the cylindrical magnet.

FIG. 13B is a 3/4 view of front/top of the cylindrical magnet 2925 with a Levitator 2910 flux pinned to the outer side portion of the magnet. Here, we will illustrate that when the Levitator is flux-pinned to the side of the cylindrical magnet certain circular motions 2900 are now allowed without any torque, resistance or breaking of Vortices 2905. We also illustrate a difference variety of Activated Orbital 2920, and Activated Image 2915 for this type of flux-pinning to the side of the cylindrical magnet. Here, we compare the previous position 2945 of the Levitator to its new position after movement.

FIG. 14A illustrates a front / cross section view demonstrating that a Levitator 3190 can be flux pinned to Vortices on lateral planes. Note the Vortices 3180 that form between the Levitator and the right side 3200 of the magnetic wall. Also note the Vortices 3195 that form between the Levitator and the left side 3205 of the magnetic wall.

FIG. 14B illustrates illustrates a front / cross section view demonstrating that a Levitator 3190 can be flux pinned to Vortices on planes both above and below it. Note the Vortices 3240 that form between the Levitator and the lower 3210 magnetic wall. Also note the Vortices 3220 that form between the Levitator and the upper 3185 magnetic wall.

FIG. 14C illustrates illustrates a front / cross section view demonstrating that a Levitator 3190 can be flux pinned to Vortices on planes both above and below it as well as on lateral planes. Note the Vortices 3240 that form between the Levitator and the lower 3210 magnetic wall. Also note the Vortices 3220 that form between the Levitator and the upper 3185 magnetic wall. Note the Vortices 3180 that form between the Levitator and the right side 3200 of the magnetic wall. Also note the Vortices 3195 that form between the Levitator and the left side 3205 of the magnetic wall.

FIG. 15A illustrates a side view / cross-section of the rectangular magnet with its field lines. An elongated-rectangular-magnet has a uniform vertical magnetic field close to midpoint of its side. Hence, an HTSC can be flux-pinned to the side of such a magnet forming a joint in which the HTSC may slide along side of the magnet's axis over a limited range (i.e. the magnet's middle). Here, we will illustrate that when the Levitator bonds to the side of the rectangular magnet certain lateral motions are now allowed without any torque, resistance or breaking of Vortices. Furthermore, we illustrate the types of movements that are prohibited to Vortices within this paradigm; such movements produce torque, resistance and ultimately the breaking of Vortices.

The rectangular magnet 3315 has been flux pinned to a Levitator 3305 with Vortices 3310 forming between them. Activated Rail 3300 and the Rail Image 3320. (Note: Rail Image; this is a linear version of an Activated Image. (i.e. the portion of the Surface Image that is correspondent to the homogeneous flux required for there to be certain unrestricted degrees of freedom—in this case a linear motion along the magnet's surface. Activated Rail; this is a linear version of an Activated Orbital. (i.e. Once a Levitator comes within range if the Rail Pattern (linear version of an Orbital Pattern) it may travel on one of the liner paths created by each Rail Image; we refer to the linear path engaged by the Levitator as the Activated Rail). We've also noted the boundary 3295 of the homogenous flux produced by the magnet in this series. Any movement beyond this region will result in the Vortices being broken. The Vortices will resist this by producing a torque force against the Levitator's movements beyond this boundary.

FIG. 15B illustrates a side view / cross-section the rectangular magnet having been flux pinned to a Levitator 3305; Levitator makes lateral motion 3330 along the Activate Rail 3300 within its allowable degree of freedom within the boundary 3295 of homogenous flux produced by the magnet. Notice that the motions illustrated here produce no torque or resistance from the Vortices 3310; the bonds are maintained throughout the action. Levitator's previous position 3335 is also noted.

FIG. 15C illustrates a side view / cross-section the rectangular magnet with the Levitator 3305. In this illustration, the Vortices bonding the Levitator to the magnet have been broken 3370. The cause of this was the Levitator committing motions beyond the Vortices' allowable degrees of freedom. Here, we illustrate how motions toward 3360 the magnet's surface in this arrangement will break Vortices (flux-pinned bonds) creating torque, resistance, and stiffness to said motions. Notice that the motions illustrated here actually produce torque or resistance from the Vortices —resulting in the Vortices (flux-pinned bonds) being broken during the action.

FIG. 15D illustrates a side view / cross-section the rectangular magnet with the Levitator 3305. In this illustration, the Vortices bonding the Levitator to the magnet —as previously observed in FIG. 15B of this series—have been broken 3390. The cause of this was the Levitator committing motions beyond the Vortices' allowable degrees of freedom. Here, we illustrate how motions away from 3380 the magnet's surface in this arrangement will break flux-pinned bonds (creating torque, resistance, and stiffness to said motions). Notice that the motions illustrated here actually produce torque or resistance from the Vortices —resulting in the flux-pinned bonds being broken during the action.

FIG. 15E illustrates a side view / cross-section the rectangular magnet with the Levitator 3305. In this illustration, the Vortices bonding the Levitator to the magnet—as previously observed in FIG. 15B of this series— have been broken. Here, we illustrate how motions beyond the boundary 3295 will break flux-pinned bonds (creating torque, resistance, and stiffness to said motions). Notice that the motions 3400 illustrated here actually produce torque or resistance from the Vortices—resulting in the flux-pinned bonds being broken 3415 during the action. Levitator's previous position 3395 is also noted.

FIG. 16A illustrates a side view / cross-section the LaunchTube. Here, we are demonstrating the interactions between Levitator 3500 and a LaunchTube 3510.

LaunchTube's utilize the flux pinning interactions discussed in FIG. 15. Here, we illustrate Levitator being deposited into LaunchTube; with the Levitator's previous position 3505 noted.

Activated Rail 3515 is a linear version of an Activated Orbital. (i.e. Once a Levitator comes within range if the Rail Pattern it may travel on one of the liner paths created by each Rail Image; we refer to the linear path engaged by the Levitator as the Activated Rail).

The Levitator is move forward 3420 in these interactions by a contactless electromagnetic motor (not illustrated here.

FIG. 16B illustrates a side view / cross-section the LaunchTube 3510. Here, we are demonstrating Levitator 3500 becoming Flux Pinned to Vortices 3430 within LaunchTube. Vortices (i.e. the flux that becomes trapped by the Levitator thereby creating flux-pinned bonds between the Levitator and the magnet) form between the Levitator and the LaunchTube's walls. Levitator moves forward along the Activated Rail 3515.

FIG. 16C illustrates a side view / cross-section the LaunchTube 3510. Here, we are demonstrating Levitator 3500 traveling down LaunchTube on the Activated Rail 3515; eventually, the Vortices suspending Levitator are purposely broken 3450 by a thermodynamic trigger (not illustrated).

FIG. 16D illustrates a side view / cross-section the LaunchTube. Levitator 3500 exiting LaunchTube. The Levitator's previous position 3480 noted.

FIG. 17A is illustrating a top view of a Superconducting Centrifuge 3495 combined with the LaunchTube 3525 for added versatility/precision. Levitator 3490 is traveling within the Superconducting Centrifuge (utilizing flux-pinning interactions identical to those discuss in FIG. 4). Once a Levitator comes within range of the Activated Orbital 3520 forming Vortices, it may travel on one of the circular paths created by homogeneous flux. The direction the Levitator's movement while flux- pinned (clockwise 3485).

FIG. 17B is illustrating a top view of a Superconducting Centrifuge 3495 combined with the LaunchTube 3525 for added versatility/precision. The Vortices connecting the Levitator 3490 to the magnetic surfaces of the Superconducting Centrifuge are purposely broken allowing the Levitator to exit 3530 the Superconducting Centrifuge at high speeds via the LaunchTube. Levitator's previous position is noted 3535.

FIG. 17C is illustrating a top view of a Superconducting Centrifuge 3495 combined with the LaunchTube 3525 for added versatility/precision. After being deposited into the LaunchTube, the Levitator 3490 engaged in creating Vortices with the Activate Rail 3570 of the LaunchTube. It then begins traveling along the LaunchTube at high speeds. The Levitator may be further accelerated by a contactless electromagnetic motor (not illustrated here). Levitator's previous position is noted 3560.

FIG. 17D is illustrating a top view of a Superconducting Centrifuge 3495 combined with the LaunchTube 3525 for added versatility/precision. As the Levitator 3490 reaches the end of the LaunchTube, its Vortices are purposely broken —via thermodynamic trigger—allowing the Levitator to exit 3595 the end of the LaunchTube at high speeds. Levitator's previous position is noted 3590.

FIG. 18A is illustrating a side/cutaway view of a Superconducting Centrifuge 3605 combined with the angled LaunchTube 3615 for added versatility/precision. Notice that the LaunchTube is angled upwards. This allows for the directional launching of a Levitating Capsule upwards without having to angle the actual Superconducting Centrifuge. If the Superconducting Centrifuge was aimed at an angle the Levitating Capsule would produced a dramatic increase in vibrational stress upon the system. Also note, the access door (within Centrifuge Wall) is closed 3620.

FIG. 18B is illustrating a side/cutaway view of a Superconducting Centrifuge 3605 combined with the angled LaunchTube 3615 for added versatility/precision. Levitator 3635 is traveling within the Superconducting Centrifuge (utilizing flux-pinning interactions Discussed in FIG. 17.) along the Activated Rail 3610. Levitator's previous position is noted 3635.

FIG. 18C is illustrating a side/cutaway view of a Superconducting Centrifuge 3605 combined with the angled LaunchTube 3615 for added versatility/precision. The Vortices connecting the Levitator to the surfaces of the Superconducting Centrifuge are purposely broken allowing the Levitator to exit the Superconducting Centrifuge at high speeds via the LaunchTube. Levitator Capsule's previous position is noted. The access door (within Centrifuge Wall) opens allowing a Levitating to exit the Superconducting Centrifuge into LaunchTube. The progressive path followed by Levitator as it is launched by the LaunchTube. Once a Levitator comes within range of the Activated Rail it may travel on the liner paths created by it.

FIG. 18D is illustrating a side/cutaway view of a Superconducting Centrifuge combined with the angled LaunchTube 3615 for added versatility/precision. After being deposited into the LaunchTube the Levitator 3690 engaged in creating Vortices with the Activate Rail 3675 of the LaunchTube. It then begins traveling along the LaunchTube at high speeds. As the Levitator reaches the end of the LaunchTube, its Vortices are purposely broken—via thermodynamic trigger—allowing the Levitator to exit the end of the LaunchTube at high speeds. Finally, access door 3695 (within LaunchTube) opens allowing a Levitating Capsule to exit. Levitator's previous position is noted 3685.

FIG. 19A is illustrating a top/cutaway view of a Superconducting Centrifuge 3710 combined with the LaunchTube 3705 for added versatility/precision. Here, we are demonstrating a Superconducting Centrifuge/LaunchTube where the LaunchTube position can be adjusted in order to further aid in the aiming of the Levitator's trajectory.

FIG. 19B is illustrating a top/cutaway view of a Superconducting Centrifuge 3710 combined with the LaunchTube 3705 for added versatility/precision. In this illustration, the LaunchTube position has been changed; and its previous position 3725 is noted.

FIG. 19C is illustrating a top/cutaway view of a Superconducting Centrifuge 3710 combined with the LaunchTube 3705 for added versatility/precision. Here, Levitator 3740 is launched from the Superconducting Centrifuge/LaunchTube after the LaunchTube's position has been altered. Also noted is the progressive path 3735 followed by Levitator as it is launched by the Superconducting Centrifuge/LaunchTube. Levitator's previous position 3730 is also noted.

FIG. 20A is illustrating a top/cutaway view of two Superconducting Centrifuges combined with LaunchTubes. Here, we demonstrate a set of (2) two Superconducting Centrifuges/ LaunchTubes with differing roles. The first 3755 Superconducting Centrifuge/LaunchTube will launch the Levitator 3770; while the second 3765 Superconducting Centrifuge/LaunchTube will catch the Levitator that was launch by the first Superconducting Centrifuge/LaunchTube. The first Superconducting Centrifuge/LaunchTube will launch the Levitator. Also noted is the progressive path followed by Levitator as it is launched by 1st Superconducting Centrifuge. Levitator's previous position 3760 is also noted. The 2nd Superconducting Centrifuge is awaiting to receive Levitator.

FIG. 20B is illustrating a top/cutaway view of two Superconducting Centrifuges combined with LaunchTubes. The second 3765 Superconducting Centrifuge/LaunchTube is catching the Levitator 3780 that was launch by the first 3755 Superconducting Centrifuge/LaunchTube. Also noted is the progressive path followed by Levitating Capsule as it is caught by 2nd Superconducting Centrifuge. Levitator's previous position 3775 is also noted.

FIG. 21A is illustrating a top/cutaway view of a Superconducting Centrifuges combined with three LaunchTubes. Here, we demonstrate a version of the Superconducting Centrifuge 3785 with several LaunchTubes, allowing for Levitators to be launched from various direction and even simultaneously. We've illustrated the first 3790, second 3795 and third 3800 LaunchTube.

FIG. 22A is 3/4 view Illustrating a series where a type of LaunchTube is demonstrated. In particular, this LaunchTube is spiraled in a vertical configuration. This is a LaunchTube that can be used alone or in coordination with any of the previously discussed Superconducting Centrifuges. This LaunchTube has a spiral magnetic path that can be flux-pinned by the Levitating Capsule. Levitating Capsule, upon being flux-pinned, can be accelerated to incredible speeds by a contactless electromagnetic motor. Once the Levitating Capsule reaches the end of the path provided by the LaunchTube, the flux-pinned bonds are deactivated allowing the Levitating Capsule to exit. We have illustrated the Entry Tube 3815, the body 3810 of the spiral, and the Exit Tube 3805.

FIG. 22B is 3/4 cutaway view of a LaunchTube with a spiraled vertical configuration. We've illustrated each of the Spiral Body's four levels. (The Spiral has four levels only as an example of one possible embodiment). First (initial) 3835 level with Entry Tube Is illustrated 3815; the Second level 3830 of the spiral as well as Third level 3825 of the spiral are also illustrated. And finally, the Fourth (final) level 3820 with Exit Tube 3805 is illustrated.

FIG. 22C is a top exploded view of a LaunchTube with a spiraled vertical configuration. We've illustrated each of the Spiral Body's four levels. (The Spiral has four levels only as an example of one possible embodiment). First (initial) 3835 level with Entry Tube Is illustrated; the Second level 3830 of the spiral as well as Third level 3825 of the spiral are also illustrated. And finally, the Fourth (final) level 3820 with Exit Tube is illustrated.

FIG. 22D is a top exploded view of a LaunchTube with a spiraled vertical configuration. We've illustrated each of the Spiral Body's four levels. Here, we observe progression of Levitator through the First (initial) level with Entry Tube 3860.

FIG. 22E is a top exploded view of a LaunchTube with a spiraled vertical configuration. We've illustrated each of the Spiral Body's four levels. Here, we observe progression of Levitator through Second level of the spiral 3865.

FIG. 22F is a top exploded view of a LaunchTube with a spiraled vertical configuration. We've illustrated each of the Spiral Body's four levels. Here, we observe progression of Levitator through the Third level of the spiral 3870.

FIG. 22G is a top exploded view of a LaunchTube with a spiraled vertical configuration. We've illustrated each of the Spiral Body's four levels. Here, we observe progression of Levitator through Fourth (final) level with Exit Tube 3875.

FIG. 23A is a 3/4 view of a LaunchTube 3880 with a spiraled vertical configuration. In the present confirmation, the Spiral has the attribute of continuously increasing the circumference of each of its upper layers. This is a LaunchTube that can be used alone or in coordination with an of the previously discussed Superconducting Centrifuges. This LaunchTube has a spiral superconducting path that can be flux-pinned by the Levitator. The Levitator upon being flux-pinned, can be accelerated to incredible speeds by a contactless electromagnetic motor (not illustrated). Once the Levitator reaches the end of the path provided by the LaunchTube, the flux-pinned bonds are deactivated allowing the Levitator to exit.

FIG. 23B is a side cutaway view a LaunchTube with a spiraled vertical configuration. In the present confirmation, the Spiral has the attribute of continuously increasing the circumference of each of its upper layers. (The Spiral has four levels only as an example of one possible embodiment). First (initial) 3895 level with Entry Tube Is illustrated; the Second level 3890 of the spiral as well as Third level 3885 of the spiral are also illustrated. And finally, the Fourth (final) level 3900 with Exit Tube is illustrated.

FIG. 23C is a top exploded view a LaunchTube with a spiraled vertical configuration. In the present confirmation, the Spiral has the attribute of continuously increasing the circumference of each of its upper layers. (The Spiral has four levels only as an example of one possible embodiment). First (smallest) 3895 level with Entry Tube Is illustrated ; the Second level 3890 of the spiral as well as Third level 3885 of the spiral are also illustrated. And finally, the Fourth (Largest) level 3900 with Exit Tube is illustrated.

FIG. 24A is a front / cutaway view of a LaunchTube that can be used alone or in coordination with an of the previously discussed Superconducting Centrifuges. Here, we demonstrate a version using curved magnetic surfaces increase the surface area available for forming Vortices with the Levitator 3930. The Lateral 3940 magnetic Surfaces illustrated here increase the surface area for forming Vortices 3935.

FIG. 24B is a front / cutaway view of a LaunchTube that can be used alone or in coordination with an of the previously discussed Superconducting Centrifuges. Here, we demonstrate a version using curved magnetic surfaces increase the surface area available for forming Vortices with the Levitator 3930. The Longitudinal 3925 magnetic Surfaces illustrated here increase the surface area for forming Vortices 3955.

FIG. 24C is a front / cutaway view of a LaunchTube that can be used alone or in coordination with an of the previously discussed Superconducting Centrifuges. Here, we demonstrate a version using tubular magnetic surfaces increase the surface area available for forming Vortices with the Levitator 3930. The tubular 3945 magnetic Surfaces illustrated here increase the surface area for forming Vortices 3955 and 3935.

FIG. 25A is illustrating a top/cutaway view of a Superconducting Centrifuge 3980. Here, we are illustrating another version of the Superconducting Centrifugal Launcher where the Levitator does not detach from the Centrifuge; instead, the Levitator acts as a accelerating platform on which the Launch Package is brought to speed. In this illustration, the Levitator / Launch Package combination 3975 spins clockwise 3970 within the centrifuge.

FIG. 25B is illustrating a top/cutaway view of a Superconducting Centrifuge. In this illustration, the Levitator / Launch Package combination 3975 have reached a point of detachment.

FIG. 25C is a top/cutaway view of a Superconducting Centrifuge. In this illustration, the Levitator 3985 has detached from the Launch Package 3990 allowing the Launch Package to exit the centrifuge.

FIG. 26A is illustrating a top/cutaway view of a Superconducting Centrifuge 4005. Here, we are illustrating another version of the Superconducting Centrifugal Launcher where the Levitator does not detach from the Centrifuge; instead, the Levitator acts as an accelerating platform on which the Launch Package is brought to speed. Furthermore, attached to the Levitator platform is a highly Reinforced Yoke to which the Launch Package is attached. The introduction of the Yoke reduces the ultimate speed that the Levitator must reach for the Launch Package to attained the desired velocity. In this illustration, the Levitator / Yoke / Launch Package combination 4000 spins clockwise 3995 within the centrifuge.

FIG. 26B is illustrating a top/cutaway view of a Superconducting Centrifuge. In this illustration, the the Levitator / Yoke / Launch Package combination 4000 have reached a point of detachment.

FIG. 26C is illustrating a top/cutaway view of a Superconducting Centrifuge. In this illustration, the Levitator / Yoke combination 4010 has detached from the Launch Package 4015 allowing the Launch Package to exit the centrifuge.

FIG. 27A is illustrating a top/cutaway view of a Superconducting Centrifuge 4030. Here, we are illustrating another version of the Superconducting Centrifugal Launcher where the Levitator does not detach from the Centrifuge; instead, the Levitator acts as a accelerating platform on which the Launch Package is brought to speed. Furthermore, attached to the Levitator platform is a highly reinforced Yoke to which the Launch Package is attached. The introduction of the Yoke reduces the ultimate speed that the Levitator must reach for the Launch Package to attained the desired velocity. In addition, one of more Reinforcing Platforms/Yokes may be attached to the primary Levitator to increase the tensile strength of the entire platform. Each Reinforcing Platforms is essentially another Levitator attached to the primary Levitator via a Reinforced Yoke. In this illustration, the Levitator / Yoke / Reinforcing Platform / Launch Package combination 4025 spins clockwise 4020 within the centrifuge.

FIG. 27B is illustrating a top/cutaway view of a Superconducting Centrifuge. In this illustration, the the Levitator / Yoke / Reinforcing Platform / Launch Package combination 4025 have reached a point of detachment.

FIG. 27C is illustrating a top/cutaway view of a Superconducting Centrifuge. In this illustration, the Levitator / Yoke / Reinforcing Platform combination 4035 has detached from the Launch Package 4040 allowing the Launch Package to exit the centrifuge.

While the present disclosure has been described in connection with a series of preferred embodiments, these descriptions are not intended to limit the scope of the disclosure to the particular forms set forth herein. The above description is illustrative and not restrictive. Many variations of the embodiments will become apparent to those of skill in the art upon review of this disclosure. The scope of this disclosure should, therefore, be determined not with reference to the above description, but instead should be determined with reference to the appended claims along with their full scope of equivalents. The present descriptions are intended to cover such alternatives, modifications, and equivalents as can be included within the spirit and scope of the disclosure as defined by the appended claims and otherwise appreciated by one of ordinary skill in the art. In several respects, embodiments of the present disclosure can act to close the loopholes in the current industry practices in which good business practices and logic are lacking because it is not feasible to implement with current resources and tools.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

What is claimed is:

1. A Centrifugal Launch System (CLS) that utilizes Levitator flux pinned to a magnetic base in a manner that allows the physical reinforcements—placed around and/or within the magnetic base—to provide contactless reinforcement to the Levitator during CLS operation; and this advanced kinetic launcher comprises:
   a Levitator, which is at least partially composed of High Temperature Superconductors (HTSC); with the HTSC having been brought to its critical temperature enabling the superconducting characteristics of its components;
   a magnetic base, which may be annular in shape; and which may be encased in (and/or embedded with) layers of reinforcement material; said reinforcement materials must not inhibit the superconductivity or magnetic penetration of various components;
   a contactless-levitating-revolute joint (or frictionless hinge) upon which the Levitator can orbit about the magnetic base in a contactless fashion; such joint will be formed as the Levitator is brought within range of the appropriate portion of the magnet's axially symmetric magnetic field—establishing a flux pinning interaction (FPI) between Levitator and magnet;
   a rotor, which will encase the Levitator, and that will act as the moving component of the CLS; whereby, the rotor/Levitator may be constructed in a manner, in which the flux pinning materials of the rotor are positioned around and within the rotor's mass to reinforce the non-flux pinning materials (within the rotor and Levitator) from centrifugal stress;
   a stator, which will encase the magnetic base, and that will act as the stationary component of the CLS; whereby the stator is be constructed in a manner, in which the non-flux pinning materials of the stator are positioned (around and (potentially) within) the stator's mass to reinforce the flux pinning materials (within the stator/magnet) from the centrifugal stress transmitted from the Levitator during the flux pinning interactions; as such, the outermost rim of the stator should be composed entirely of the materials that are not undergoing flux pinning interactions;
   a contactless electromagnetic motor/generator, wherein the motor—using electricity—accelerates the rotor to store energy, and wherein rotor's motion generates electricity via the generator;
   a vacuum chamber, in which all (or a portion of) the air has been evacuated, to reduce friction and increase insulation; and
   a refrigeration (and insulation) system for the retention of the critical temperature(s) of the superconducting components.

2. The system of claim 1, wherein the Levitator and Rotor are conjoined.

3. The system of claim 1, wherein the encasing reinforcement is of composed reinforcement surrounding/enveloping the materials undergoing flux pinning interactions.

4. The system of claim 1, further comprising:
   a thermodynamic trigger, which—upon being activated—disrupts the critical temperature of HTSC ceasing superconductivity causing the Levitator to be released from the flux pinning interactions (upon the trigger's deactivation superconductivity will be restored).

5. The system of claim 1, further comprising:
   an aperture mechanism (within the CLS enclosure) that opens the enclosure—upon release of the payload from the CLS—allowing the payload to exit the enclosure.

6. A method of launching projectiles via a superconducting centrifugal launcher, this advanced kinetic launch method comprises:
   providing a levitator, wherein the Levitator is at least partially composed of high temperature superconductors;
   providing a magnet, wherein the magnet has an annular shape;
   forming a frictionless hinge, wherein the Levitator (encased within the rotor) is placed within range of the magnet's axially symmetric magnetic field while maintaining a space between the Levitator and the magnet, and wherein the Levitator is positioned along a particular degree-of-freedom desired for the frictionless hinge, and wherein the high temperature superconductors are at (or below) their critical temperature(s), and wherein the magnet/stator is designated as the stationary portion of the frictionless hinge and the Levitator/rotor is designated as the rotating portion of the frictionless hinge;
   providing a stator, wherein the stator has an encasement that is comprised of reinforcement materials, and wherein the stator has a repository that can completely encases the magnet;
   providing a rotor, wherein the rotor has an encasement that is comprised of materials that can engage in flux pinning, and wherein the rotor has a repository that completely encase Levitator; and
   flux pinning the rotor's encasement to the frictionless hinge.

7. A method of claim 6, wherein the Levitator has embedded reinforcement that is composed of layers of reinforcement with the mass of the Levitator.

8. A method of claim 6, wherein the magnet has embedded reinforcement that is composed of layers of reinforcement with the mass of the magnet.

9. A method of claim 6, wherein the magnetic is a superconducting permanent magnet (i.e. a trapped field magnet) that is composed of superconductors; wherein said superconductors are at (or below) their critical temperature(s) enabling their superconducting properties.

10. A method of claim 6, wherein the magnet is flux pinned to multiple Levitators forming multiple frictionless hinges.

11. A method of claim 6, wherein the Levitator is flux pinned to multiple magnets forming multiple frictionless hinges.

12. A method of claim 6, wherein the rotor is flux pinned to multiple stators.

13. A method of claim 6, wherein the stator is flux pinned to multiple rotors.

14. A method of claim 6, wherein a contactless motor/generator system moves the Levitator within the Centrifugal Launcher.

15. A method of claim 6, wherein the Centrifugal Launcher has been placed into a vacuum chamber, in which some of the air has been evacuated, resulting a vacuum being maintained within.

16. A method of claim 15, wherein an aperture mechanism (within the vacuum enclosure) that opens the enclosure—upon release of the payload from the launcher—allowing the payload to exit the enclosure.

17. A method of claim 6, wherein a cryogenic refrigeration system continuously cools the superconducting components at (or below) their critical temperature(s).

18. A method of claim 6, wherein a thermodynamic trigger ceases the superconductivity of the Levitator's HTSC materials causing it to be released from the flux pinning interactions.

19. A method of claim 18, wherein the Levitator is allowed to move from an inner orbital (or track) within the Centrifugal Launcher to an outer orbital (or track) within the Centrifugal Launcher; whereupon the thermodynamic trigger allows the superconductivity of the Levitator's HTSC materials to recommence, allowing the Levitator to engage in flux pinning interaction along the new outer orbital (or track).

20. A method of claim 18, wherein the Levitator is allowed to move from orbital (or track) within the Centrifugal Launcher to another more linear rail (or track); whereupon reaching this rail (or track), the thermodynamic trigger allows the superconductivity of the Levitator's HTSC materials to recommence, allowing the Levitator to engage in flux pinning interaction along the new rail line (or track).

21. A method of claim 20, wherein the Levitator is allowed to reach the end of the more linear track, whereupon the thermodynamic trigger ceases the superconductivity of the Levitator's HTSC materials causing it to be released from the flux pinning interactions.

22. A method of claim 18, wherein the Levitator is released from one Centrifugal Launcher and caught by another Centrifugal Launcher in a remote location.

* * * * *